(12) United States Patent
Sundberg et al.

(10) Patent No.: US 12,431,568 B2
(45) Date of Patent: Sep. 30, 2025

(54) ELECTRONIC VAPING DEVICE

(71) Applicant: Altria Client Services LLC, Richmond, VA (US)

(72) Inventors: Sean Sundberg, Richmond, VA (US); Ryan Alan Bailey, Richmond, VA (US); Charles Dendy, Ruther Glen, VA (US); Robert Arents, Richmond, VA (US); Christopher S. Tucker, Midlothian, VA (US); Nam Tran, Richmond, VA (US)

(73) Assignee: Altria Client Services LLC, Richmond, VA (US)

( * ) Notice: Subject to any disclaimer, the term of this patent is extended or adjusted under 35 U.S.C. 154(b) by 791 days.

(21) Appl. No.: 16/049,346

(22) Filed: Jul. 30, 2018

(65) Prior Publication Data

US 2020/0029619 A1    Jan. 30, 2020

(51) Int. Cl.
| | |
|---|---|
| *A24F 40/10* | (2020.01) |
| *A24F 7/02* | (2006.01) |
| *A24F 40/40* | (2020.01) |
| *A24F 40/42* | (2020.01) |
| *A24F 40/60* | (2020.01) |
| *H01M 50/213* | (2021.01) |

(52) U.S. Cl.
CPC ............. *H01M 50/213* (2021.01); *A24F 7/02* (2013.01); *A24F 40/10* (2020.01); *A24F 40/42* (2020.01); *A24F 40/40* (2020.01)

(58) Field of Classification Search
CPC .......... A24F 40/00; A24F 40/10; A24F 40/40; A24F 40/42; A24F 40/485; A24F 40/60; A24F 40/53
See application file for complete search history.

(56) References Cited

U.S. PATENT DOCUMENTS

| | | |
|---|---|---|
| 4,083,372 A | 4/1978 | Boden |
| 5,034,721 A | 7/1991 | Benedictus |
| 5,388,594 A | 2/1995 | Counts et al. |

(Continued)

FOREIGN PATENT DOCUMENTS

| | | |
|---|---|---|
| CN | 202489175 U | 10/2012 |
| CN | 203446525 U | 2/2014 |

(Continued)

OTHER PUBLICATIONS

International Search Report and Written Opinion thereof dated Nov. 22, 2019 for correspondind International Application No. PCT/EP2019/070556.

(Continued)

*Primary Examiner* — Alex B Efta
(74) *Attorney, Agent, or Firm* — Harness, Dickey & Pierce, P.L.C.

(57) ABSTRACT

A power supply assembly for an e-vaping device may include a coupling interface configured to couple with a cartridge to configure the e-vaping device to generate a vapor, a light-emitting device, and a light tube structure extending from the light-emitting device and through the coupling interface. The light tube structure may channel light emitted by the light-emitting device to emit the light into a reservoir of the cartridge to cause at least one portion of the cartridge to emit at least a portion of the channeled light to an external environment.

46 Claims, 10 Drawing Sheets

(56) References Cited

U.S. PATENT DOCUMENTS

| | | |
|---|---|---|
| 5,665,262 A | 9/1997 | Hajaligol et al. |
| 5,750,964 A | 5/1998 | Counts et al. |
| 6,603,924 B2 | 8/2003 | Brown et al. |
| 8,191,555 B2 | 6/2012 | Herbrich et al. |
| 8,375,957 B2 | 2/2013 | Hon |
| 8,393,331 B2 | 3/2013 | Hon |
| D688,415 S | 8/2013 | Kim |
| 8,499,766 B1 | 8/2013 | Newton |
| 8,528,569 B1 | 9/2013 | Newton |
| D693,053 S | 11/2013 | Chen |
| D695,450 S | 12/2013 | Benassayag et al. |
| 8,746,240 B2 | 6/2014 | Terry et al. |
| 8,757,147 B2 | 6/2014 | Terry et al. |
| 8,794,231 B2 | 8/2014 | Thorens et al. |
| 8,833,364 B2 | 9/2014 | Buchberger |
| 8,851,068 B2 | 10/2014 | Cohen et al. |
| D720,095 S | 12/2014 | Alima |
| D720,496 S | 12/2014 | Alima |
| D720,881 S | 1/2015 | Liu |
| D724,782 S | 3/2015 | Wu |
| D728,155 S | 4/2015 | Liu |
| D728,156 S | 4/2015 | Wu |
| D729,441 S | 5/2015 | Hua |
| 9,055,617 B2 | 6/2015 | Thorens et al. |
| 9,072,321 B2 | 7/2015 | Liu |
| 9,095,175 B2 | 8/2015 | Terry et al. |
| 9,101,729 B2 | 8/2015 | Liu |
| 9,210,738 B2 | 12/2015 | Ward et al. |
| 9,210,739 B2 | 12/2015 | Chabach et al. |
| D748,852 S | 2/2016 | Wu |
| D749,260 S | 2/2016 | Wu |
| D751,249 S | 3/2016 | Chen |
| 9,271,525 B2 | 3/2016 | Liu |
| 9,282,772 B2 | 3/2016 | Tucker et al. |
| 9,289,014 B2 | 3/2016 | Tucker et al. |
| D758,649 S | 6/2016 | Liu |
| D764,703 S | 8/2016 | Liu |
| D765,307 S | 8/2016 | Liu |
| 9,420,829 B2 | 8/2016 | Thorens et al. |
| 9,427,711 B2 | 8/2016 | Terry et al. |
| D765,907 S | 9/2016 | Liu |
| 9,439,455 B2 | 9/2016 | Alarcon et al. |
| D774,247 S | 12/2016 | Chen |
| 9,510,623 B2 | 12/2016 | Tucker et al. |
| D778,492 S | 2/2017 | Liu |
| D778,493 S | 2/2017 | Scott |
| D780,372 S | 2/2017 | Liu |
| D784,610 S | 4/2017 | Bosch |
| D785,859 S | 5/2017 | Pang |
| 9,949,510 B2 | 4/2018 | Liu |
| D827,195 S | 8/2018 | Chen |
| D833,064 S | 11/2018 | Verleur et al. |
| D834,246 S | 11/2018 | Qiu |
| D835,337 S | 12/2018 | Beer et al. |
| D835,574 S | 12/2018 | Trongone |
| 10,226,076 B2 | 3/2019 | Althorpe et al. |
| 10,440,997 B2 | 10/2019 | Borkovec et al. |
| 10,506,827 B2 | 12/2019 | Guo et al. |
| 10,687,557 B2 | 6/2020 | Tucker et al. |
| 10,772,356 B2 | 9/2020 | Tucker et al. |
| 10,932,496 B2 * | 3/2021 | Tucker ............... H05B 3/46 |
| 11,930,843 B2 | 3/2024 | Tasselli et al. |
| 2006/0231641 A1 | 10/2006 | Uchiyama et al. |
| 2010/0293979 A1 | 11/2010 | Shei et al. |
| 2011/0126848 A1 | 6/2011 | Zuber et al. |
| 2011/0155153 A1 * | 6/2011 | Thorens ............... H05B 3/58 |
| | | 131/329 |
| 2012/0174914 A1 | 7/2012 | Pirshafiey et al. |
| 2013/0019887 A1 * | 1/2013 | Liu ............... A24F 40/60 |
| | | 131/329 |
| 2013/0192623 A1 | 8/2013 | Tucker et al. |
| 2013/0213419 A1 * | 8/2013 | Tucker ............... A24F 40/46 |
| | | 131/328 |
| 2013/0255675 A1 | 10/2013 | Liu |
| 2013/0306064 A1 | 11/2013 | Thorens et al. |
| 2013/0306065 A1 | 11/2013 | Thorens et al. |
| 2014/0048086 A1 | 2/2014 | Zhanghua |
| 2014/0053856 A1 | 2/2014 | Liu |
| 2014/0261487 A1 | 9/2014 | Chapman et al. |
| 2014/0270729 A1 | 9/2014 | DePiano et al. |
| 2014/0283855 A1 | 9/2014 | Hawes et al. |
| 2014/0283859 A1 | 9/2014 | Minskoff et al. |
| 2014/0345635 A1 | 11/2014 | Rabinowitz et al. |
| 2015/0020823 A1 * | 1/2015 | Lipowicz ............... A24B 15/167 |
| | | 131/359 |
| 2015/0027470 A1 | 1/2015 | Kane et al. |
| 2015/0083147 A1 | 3/2015 | Schiff et al. |
| 2015/0101625 A1 | 4/2015 | Newton et al. |
| 2015/0128973 A1 | 5/2015 | Li et al. |
| 2015/0144145 A1 | 5/2015 | Chang et al. |
| 2015/0181930 A1 | 7/2015 | Liu |
| 2015/0181944 A1 | 7/2015 | Li et al. |
| 2015/0216233 A1 | 8/2015 | Sears et al. |
| 2015/0216234 A1 | 8/2015 | Chung |
| 2015/0216236 A1 | 8/2015 | Bless et al. |
| 2015/0245654 A1 | 9/2015 | Memari et al. |
| 2015/0245658 A1 | 9/2015 | Worm et al. |
| 2015/0245669 A1 * | 9/2015 | Cadieux ............... A61M 15/06 |
| | | 131/329 |
| 2015/0272217 A1 | 10/2015 | Chen |
| 2015/0305408 A1 | 10/2015 | Liu |
| 2015/0305410 A1 | 10/2015 | Liu |
| 2015/0313275 A1 | 11/2015 | Anderson et al. |
| 2015/0313282 A1 | 11/2015 | Ademe et al. |
| 2015/0328415 A1 * | 11/2015 | Minskoff ............... A24F 40/60 |
| | | 128/202.21 |
| 2015/0335075 A1 | 11/2015 | Minskoff et al. |
| 2015/0351456 A1 | 12/2015 | Johnson et al. |
| 2015/0359265 A1 | 12/2015 | Liu |
| 2016/0057811 A1 | 2/2016 | Alarcon et al. |
| 2016/0073694 A1 | 3/2016 | Liu |
| 2016/0091194 A1 | 3/2016 | Liu |
| 2016/0100633 A1 | 4/2016 | Gao |
| 2016/0106153 A1 | 4/2016 | Zhu |
| 2016/0135505 A1 | 5/2016 | Li et al. |
| 2016/0150828 A1 | 6/2016 | Goldstein et al. |
| 2016/0183596 A1 | 6/2016 | Rado |
| 2016/0192709 A1 * | 7/2016 | Liu ............... A24F 1/30 |
| | | 131/329 |
| 2016/0227837 A1 | 8/2016 | Hammel et al. |
| 2016/0242466 A1 | 8/2016 | Lord et al. |
| 2016/0262453 A1 | 9/2016 | Ampolini et al. |
| 2016/0309785 A1 | 10/2016 | Holtz |
| 2016/0309786 A1 | 10/2016 | Holtz et al. |
| 2016/0309787 A1 | 10/2016 | Hawes et al. |
| 2016/0309788 A1 | 10/2016 | Hawes et al. |
| 2016/0324216 A1 | 11/2016 | Li et al. |
| 2016/0331037 A1 | 11/2016 | Cameron |
| 2016/0345633 A1 | 12/2016 | DePiano et al. |
| 2016/0360789 A1 | 12/2016 | Hawes et al. |
| 2016/0363917 A1 * | 12/2016 | Blackley ............... G06F 3/0488 |
| 2016/0366931 A1 * | 12/2016 | Zhang ............... F16L 37/004 |
| 2016/0366947 A1 | 12/2016 | Monsees et al. |
| 2017/0000192 A1 | 1/2017 | Li |
| 2017/0013880 A1 | 1/2017 | O'Brien et al. |
| 2017/0027227 A1 | 2/2017 | Lipowicz |
| 2017/0042240 A1 | 2/2017 | Murison |
| 2017/0064999 A1 | 3/2017 | Perez et al. |
| 2017/0079323 A1 | 3/2017 | Wang |
| 2017/0105450 A1 * | 4/2017 | Reed ............... A24F 40/42 |
| 2017/0135405 A1 * | 5/2017 | Reevell ............... H01C 7/06 |
| 2017/0150757 A1 | 6/2017 | Worm et al. |
| 2017/0224016 A1 | 8/2017 | Reevell |
| 2017/0231283 A1 | 8/2017 | Gadas |
| 2017/0231286 A1 | 8/2017 | Borkovec et al. |
| 2017/0265523 A1 | 9/2017 | Lipowicz |
| 2017/0273354 A1 | 9/2017 | Tucker et al. |
| 2017/0325502 A1 | 11/2017 | Nelson et al. |
| 2018/0007966 A1 | 1/2018 | Li et al. |
| 2018/0027879 A1 | 2/2018 | Gavrielov et al. |
| 2018/0077967 A1 | 3/2018 | Hatton et al. |
| 2018/0132525 A1 | 5/2018 | Patil et al. |
| 2018/0161525 A1 | 6/2018 | Liu et al. |
| 2018/0303163 A1 * | 10/2018 | Baker ............... A24F 40/50 |

(56) References Cited

U.S. PATENT DOCUMENTS

| | | | |
|---|---|---|---|
| 2019/0133187 A1 | 5/2019 | Spencer et al. | |
| 2019/0269178 A1 | 9/2019 | Karles et al. | |
| 2019/0373679 A1* | 12/2019 | Fu | A24F 7/00 |
| 2019/0387805 A1 | 12/2019 | Rostami | |
| 2020/0029619 A1 | 1/2020 | Sundberg et al. | |
| 2020/0120984 A1 | 4/2020 | Rogan | |
| 2021/0176826 A1* | 6/2021 | Tucker | A24F 40/50 |
| 2024/0058557 A1* | 2/2024 | Alarcon | G01F 1/6888 |

FOREIGN PATENT DOCUMENTS

| | | | | |
|---|---|---|---|---|
| CN | 203538371 U | | 4/2014 | |
| CN | 203762291 U | | 8/2014 | |
| CN | 104219973 A | | 12/2014 | |
| CN | 104244749 A | | 12/2014 | |
| CN | 104720115 A | | 6/2015 | |
| CN | 105101507 A | | 11/2015 | |
| CN | 105188428 A | | 12/2015 | |
| CN | 105455198 A | * | 4/2016 | A24F 47/00 |
| CN | 105530825 A | | 4/2016 | |
| CN | 106231933 A | | 12/2016 | |
| CN | 106455711 A | | 2/2017 | |
| CN | 205947122 U | | 2/2017 | |
| CN | 107072293 A | | 8/2017 | |
| CN | 107072314 A | | 8/2017 | |
| CN | 107752129 A | | 3/2018 | |
| CN | 207613205 U | | 7/2018 | |
| EA | 000244 B1 | | 2/1999 | |
| EM | 002337410-0009 | | 11/2013 | |
| EM | 002337410-0012 | | 11/2013 | |
| EM | 002403444-0003 | | 2/2014 | |
| EM | 002412106-0001 | | 3/2014 | |
| EM | 001420327-0005 | | 11/2017 | |
| EP | 0973419 A1 | | 1/2000 | |
| EP | 2404515 A1 | | 1/2012 | |
| EP | 2574247 A1 | | 4/2013 | |
| EP | 3015010 A1 | | 5/2016 | |
| EP | 3075270 A1 | | 10/2016 | |
| EP | 3135139 A1 | | 3/2017 | |
| EP | 3345154 A1 | | 7/2018 | |
| ES | D0518506-03 | | 1/2013 | |
| ES | D0517952-09 | | 10/2013 | |
| ES | D0518082-12 | | 11/2013 | |
| ES | D0518097-04 | | 11/2013 | |
| ES | D0518201-12 | | 11/2013 | |
| ES | D0518036-03 | | 12/2013 | |
| ES | D0518299-03 | | 12/2013 | |
| ES | D0518462-09 | | 1/2014 | |
| ES | D0519904-04 | | 9/2014 | |
| GB | 4032478 | | 11/2013 | |
| JP | 2016-511008 A | | 4/2016 | |
| JP | 2017-512470 A | | 5/2017 | |
| JP | 3210447 U | | 5/2017 | |
| JP | 3213257 U | | 10/2017 | |
| JP | 2019-524121 A | | 9/2019 | |
| KR | 10-1486294 B1 | | 1/2015 | |
| KR | 10-2017-0044158 A | | 4/2017 | |
| KR | 10-2018-0048846 A | | 5/2018 | |
| KR | 10-2018-0083316 A | | 7/2018 | |
| PL | 21430-0001 | | 5/2015 | |
| PT | 3429-0001 | | 11/2013 | |
| PT | 3428-0003 | | 12/2013 | |
| PT | 3771-0007 | | 8/2014 | |
| RS | 9612-0001 | | 3/2000 | |
| RU | 2604313 C2 | | 12/2016 | |
| RU | 2607067 C2 | | 1/2017 | |
| RU | 2620754 C2 | | 5/2017 | |
| RU | 2627002 C2 | | 8/2017 | |
| RU | 2638514 C2 | | 12/2017 | |
| RU | 2639972 C2 | | 12/2017 | |
| RU | 2644314 C2 | | 2/2018 | |
| TR | 201307255-0001 | | 1/2014 | |
| WO | WO-9406314 A1 | | 3/1994 | |
| WO | WO-2007/078273 A1 | | 7/2007 | |
| WO | WO-2014/066730 A1 | | 5/2014 | |
| WO | WO-2014/150979 A2 | | 9/2014 | |
| WO | WO-2015/027470 A1 | | 3/2015 | |
| WO | WO-2015/114327 A1 | | 8/2015 | |
| WO | WO-2015/124688 A1 | | 8/2015 | |
| WO | WO-2015131428 A1 | | 9/2015 | |
| WO | WO-2015/144822 A1 | | 10/2015 | |
| WO | WO-2016/065926 A1 | | 5/2016 | |
| WO | WO-2016/079152 A1 | | 5/2016 | |
| WO | WO-2016/144966 A1 | | 9/2016 | |
| WO | WO-2016/156509 A1 | | 10/2016 | |
| WO | WO-2016/162492 A1 | | 10/2016 | |
| WO | WO-2016/172441 A1 | | 10/2016 | |
| WO | WO-2016/172448 A1 | | 10/2016 | |
| WO | WO-2016154994 A1 | | 10/2016 | |
| WO | WO-2017/017970 A1 | | 2/2017 | |
| WO | WO-2017/021536 A2 | | 2/2017 | |
| WO | WO-2017/055802 A1 | | 4/2017 | |
| WO | WO-2017/084849 A1 | | 5/2017 | |
| WO | WO-2017/144703 A1 | | 8/2017 | |
| WO | WO-2017/162691 A1 | | 9/2017 | |
| WO | 2017/205692 A1 | | 11/2017 | |
| WO | WO-2017/186477 A1 | | 11/2017 | |
| WO | 2016/102696 A1 | | 6/2018 | |

OTHER PUBLICATIONS

International Preliminary Report on Patentability and Written Opinion thereof dated Jul. 9, 2020 for corresponding International Application No. PCT/EP2018/086849.

International Preliminary Report on Patentability dated Apr. 23, 2020 for corresponding International Application No. PCT/EP2018/077806.

U.S. Office Action dated Oct. 21, 2021 for corresponding U.S. Appl. No. 15/729,909.

International Search Report and Written Opinion thereof dated Dec. 12, 2019 for corresponding International Application No. PCT/EP2019/070559.

U.S. Office Action dated Apr. 28, 2021 for corresponding U.S. Appl. No. 15/729,909.

Innokin Recommends New Electronic Cigarette to Smokers, last updated May 18, 2017.

T Spindle, "Examination of Electronic Cigarette User Puff Topography: the Effect of a Mouthpiece-Based Topography: Measurement Device on Plasma Nicotine and Subjective Effects", VCU Scholars Compass, Sep. 2015.

United States Office Action for corresponding U.S. Appl. No. 29/621,730 dated Dec. 17, 2018.

International Search Report and Written Opinion thereof dated Jan. 22, 2019 for corresponding International Application No. PCT/EP2018/077806.

International Search Report and Written Opinion thereof dated Jan. 21, 2019 for corresponding International Application No. PCT/EP2018/077799.

U.S. Notice of Allowance dated Feb. 24, 2020 for corresponding U.S. Appl. No. 15/858,425.

Written Opinion of the International Preliminary Examining Authority dated Jun. 10, 2020 for corresponding International Application No. PCT/EP2019/070559.

International Search Report dated Mar. 20, 2019 for corresponding International Application No. PCT/EP2018/086849.

U.S. Office Action dated Sep. 20, 2021 for corresponding U.S. Appl. No. 16/049,450.

U.S. Office Action dated Mar. 3, 2021 for corresponding U.S. Appl. No. 16/049,450.

U.S. Notice of Allowance dated May 6, 2020 for corresponding U.S. Appl. No. 15/729,895.

United States Office Action for U.S. Appl. No. 15/858,425, dated Oct. 10, 2019.

U.S. Notice of Allowance dated Oct. 27, 2020 for corresponding U.S. Appl. No. 15/931,999.

International Preliminary Report on Patentability dated Jun. 30, 2020 for corresponding International Application No. PCT/EP2019/070556.

(56) References Cited

OTHER PUBLICATIONS

U.S. Office Action dated Jan. 23, 2020 for corresponding U.S. Appl. No. 15/729,895.
U.S. Notice of Allowance dated Jan. 29, 2020 for corresponding U.S. Appl. No. 15/858,425.
Atomizer & Coil: Authentic GS-H5L 3.0 ml BCC Atomizer with LED light, http://www.ecigaretteb2c.com (Year: 2014).
United States Notice of Allowance for U.S. Appl. No. 29/621,730, dated Aug. 14, 2019.
U.S. Notice of Allowance dated Apr. 27, 2022 for corresponding U.S. Appl. No. 16/049,450.
European Office Action dated Mar. 29, 2022 for corresponding European Application No. 19752663.5.
U.S. Office Action dated Dec. 14, 2021 for corresponding U.S. Appl. No. 16/049,450.
Russian Office Action and Search Report dated Nov. 26, 2021 for corresponding Russian Application No. 2020114678, and English-language translation thereof.
Russian Office Action and Search Report dated Nov. 25, 2021 for corresponding Russian Application No. 2020115145, and English-language translation thereof.
U.S. Notice of Allowance dated Mar. 22, 2022 for corresponding U.S. Appl. No. 16/049,450.
U.S. Office Action dated Mar. 16, 2022 for corresponding U.S. Appl. No. 15/729,909.
"The Stunning High Tech PCC Love eCig Smart Pod Starter Kit"—Jun. 22, 2012, http://www.sbwire.com/press-releases/the-stunning-high-tech-pcc-love-ecig-smart-pod-starter-kit-147288.htm.
European Notice of Allowance dated Aug. 25, 2021, for corresponding European Application No. 18829884.8.
Russian Office Action and Search Report dated Dec. 23, 2021, for corresponding Russian Application No. 2020123230, and English-language translation thereof.
Russian Office Action dated Apr. 8, 2022, for corresponding Russian Application No. 2020115145, and English-language translation thereof.
Russian Notice of Allowance dated Apr. 14, 2022, for corresponding Russian Application No. 2020114678, and English-language translation thereof.
Russian Notice of Allowance dated Apr. 28, 2022, for corresponding Russian Application No. 2020123230, and English-language translation thereof.
Russian Notice of Allowance dated Jul. 14, 2022, for corresponding Russian Application No. 2020115145, and English-language translation thereof.
Brazilian Office Action dated Jul. 21, 2022 for corresponding Brazilian Application No. BR112020010419-1, and English-language translation thereof.
U.S. Office Action dated Sep. 1, 2022 for corresponding U.S. Appl. No. 16/992,810.
Brazilian Office Action dated Jul. 21, 2022, for corresponding Brazilian Application No. BR112020005293-0, and English-language translation thereof.
U.S. Notice of Allowance dated Oct. 26, 2022, for corresponding U.S. Appl. No. 16/049,450.
Brazilian Office Action published in the Brazilian Industrial Property Journal on Sep. 20, 2022, for corresponding Brazilian Application No. 112020006347-9, and English-language translation thereof.
U.S. Office Action dated Oct. 5, 2022, for corresponding U.S. Appl. No. 15/729,909.
Japanese Office Action for corresponding Application No. 2020-517203, dated Oct. 13, 2022, English translation included.
Japanese Office Action dated Oct. 19, 2022, for corresponding Japanese Application No. 2020-518434, and English-language translation thereof.
U.S. Notice of Allowance dated Nov. 25, 2022, for corresponding U.S. Appl. No. 17/155,246.
Russian Office Action and Search Report dated Nov. 17, 2022, for corresponding Russian Application No. 2021104907, and English-language translation thereof.
U.S. Notice of Allowance dated Dec. 27, 2022, for corresponding U.S. Appl. No. 16/049,450.
Japanese Notice of Allowance dated Jan. 30, 2023, for corresponding Japanese Application No. 2020-518434, and English-language translation thereof.
Japanese Decision to Grant dated Mar. 13, 2023 for corresponding Japanese Application No. 2020-533704, and English-language translation thereof.
Brazilian Office Action dated Jan. 5, 2023 and published in the Brazilian Industrial Property Journal on Feb. 28, 2023 for corresponding Brazilian Application No. BR112020026871-2, and English-language translation thereof.
Chinese Office Action and Search Report dated Feb. 18, 2023, for corresponding Chinese Application No. 201880060418.8, and English-language translation thereof.
U.S. Office Action dated Feb. 15, 2023 for corresponding U.S. Appl. No. 15/729,909.
Japanese Office Action dated Dec. 12, 2022 for corresponding Japanese Application No. 2020-533704, and English-language translation thereof.
Chinese Office Action dated Jan. 29, 2023 for corresponding Chinese Application No. 201880060406.5, and English-language translation thereof.
Notice of Allowance dated Mar. 2, 2023 issued in related U.S. Appl. No. 16/992,810.
Russian Decision to Grant and Search Report dated Mar. 1, 2023 for corresponding Russian Application No. 2021103129, and English-language translation thereof.
U.S. Notice of Allowance dated Mar. 9, 2023 for corresponding U.S. Appl. No. 17/155,246.
U.S. Notice of Allowance dated Mar. 31, 2023, for corresponding U.S. Appl. No. 16/049,450.
Russian Notice of Allowance dated Apr. 10, 2023, for corresponding Russian Application No. 2021104907, and English-language translation thereof.
Office Action dated May 15, 2023, issued in related Japanese patent application No. 2021-503600.
Office Action dated Jun. 2, 2023, issued in related U.S. Appl. No. 16/992,810.
Office Action dated May 29, 2023, issued in related Japanese patent application No. 2020-517203.
Office Action dated Mar. 1, 2023, for Chinese Application No. 201880078750.7 and English-language translation thereof.
U.S. Notice of Allowance dated Jun. 29, 2023 for corresponding U.S. Appl. No. 16/049,450.
Chinese Office Action dated Jun. 28, 2023 for corresponding Chinese Application No. 201880060406.5 and English-language translation thereof.
Japanese Office Action dated Jun. 15, 2023 issued in related Japanese patent application No. 2021-500282.
Korean Office Action dated Jul. 13, 2023 issued in Korean patent application No. 10-2020-7012756, and English-language translation thereof.
Notice of Allowance dated Sep. 14, 2023 issued in U.S. Appl. No. 16/992,810.
Office Action dated Sep. 27, 2023 issued in U.S. Appl. No. 15/729,909.
Korean Office Action dated Aug. 18, 2023 for Korean patent application No. 10-2020-7012757, and English-language translation thereof.
Japanese Decision to Grant dated Oct. 5, 2023 for corresponding Japanese Application No. 2021-503600, and English translation thereof.
Chinese Office Action dated Nov. 9 2023 for Chinese Application No. 201880060418.8, and English-language translation thereof.
Office Action and Search Report dated Oct. 21, 2023 issued in corresponding Chinese patent application No. 201980045676.3 and English-language translation thereof.
Notice of Allowance dated Nov. 8, 2023 isused in related U.S. Appl. No. 16/049,450.

(56) References Cited

OTHER PUBLICATIONS

Chinese Office Action dated Nov. 30, 2023 for Chinese Application No. 201880078750.7, and English-language translation thereof.
Korean Office Action dated Nov. 24, 2023 for Korean Application No. 10-2020-7019287, and English-language translation thereof.
Chinese Office Action and Search Report dated Nov. 23, 2023 for Chinese Application No. 201980045660.2, and English-language translation thereof.
Japanese Decision of Rejection dated Dec. 4, 2023 issued in Japanese patent application No. 2020-517203.
U.S. Notice of Allowance dated Feb. 14, 2024 for corresponding U.S. Appl. No. 16/992,810.
U.S. Notice of Allowance dated Feb. 16, 2024 for corresponding U.S. Appl. No. 15/729,909.
Japanese Decision to Grant dated Oct. 26, 2023 for Japanese Application No. 2021-500282, and English-language translation thereof.
Chinese Notice of Allowance for Chinese Application No. 201880078750.7 mailed on Apr. 1, 2024.
Office Action dated Feb. 28, 2024 issued in Korean patent application No. 10-2020-7012756.
Notice of Allowance dated Feb. 26, 2023 issued in Korean patent application No. 10-2020-7012757.
Notice of Allowance dated Apr. 12, 2024 issued in U.S. Appl. No. 16/049,450.
Notice of Allowance issued Mar. 14, 2024 in U.S. Appl. No. 16/982,810.
Notice of Allowance issued Mar. 13, 2024 in U.S. Appl. No. 18/352,407.
Notice of Allowance issued Apr. 3, 2024 in U.S. Appl. No. 17/155,246.
Notice of Allowance dated May 2, 2024 issued in U.S. Appl. No. 18/352,407.
Korean Notice of Allowance for Korean Patent Application No. 10-2020-7019287 dated May 1, 2024 and English translation thereof.
Notice of Allowance issued May 22, 2024 issued in U.S. Appl. No. 17/155,246.
Office Action dated Jun. 13, 2024 issued in U.S. Appl. No. 18/480,586.
Notice of Allowance dated Jun. 17, 2024 issued in Japanese Patent Application No. 2020-517203.
Office Action dated Jun. 26, 2024 issued in U.S. Appl. No. 16/049,450.
European Office Action dated Jun. 5, 2024 for corresponding European Application No. 19752663.5.
Office Action dated Aug. 7, 2024 issued in U.S. Appl. No. 18/411,538.
Office Action dated Aug. 7, 2024 issued in U.S. Appl. No. 16/992,810.
Notice of Allowance issued Aug. 21, 2024 issued in U.S. Appl. No. 17/155,246.
Notice of Allowance issued Aug. 20, 2024 issued in U.S. Appl. No. 18/352,407.
Decision to Refuse dated Jun. 27, 2024 issued in European patent application No. 19752663.5.
Notice of Allowance issued Jul. 26, 2024 issued in U.S. Appl. No. 16/992,810.
Office Action dated Sep. 26, 2024 issued in U.S. Appl. No. 18/480,586.
Notice of Allowance dated Oct. 1, 2024 issued in U.S. Appl. No. 17/893,614.
Notice of Allowance issued Sep. 30, 2024 in U.S. Appl. No. 18/352,407.
Notice of Allowance dated Jul. 24, 2024 issued in Korean patent application No. 10-2020-7012756 and English translation thereof.
Office Action mailed Aug. 20, 2024 issued in Brazilian Patent Application No. 1120200052930.
Office Action dated Sep. 14, 2024 issued in Korean patent application No. 10-2021-7004399.
Notice of Allowance dated Dec. 20, 2024 issued in U.S. Appl. No. 18/411,538.
Notice of Allowance issued Nov. 29, 2024 issued in U.S. Appl. No. 16/992,810.
Notice of Allowance dated Dec. 2, 2024 issued in U.S. Appl. No. 16/049,450.
Extended European Search Report for European Application No. 24196619.1 issued on Dec. 9, 2024.
Notice of Allowance dated Dec. 18, 2024 issued in U.S. Appl. No. 18/411,538.
Office Action dated Jan. 13, 2023 issued in U.S. Appl. No. 18/480,586.
Notice of Allowance dated Feb. 8, 2025 issued in Korean patent application No. 10-2021-7004862.
Notice of Allowance dated Feb. 24, 2025 issued in Korean patent application No. 10-2021-7004399.
Notice of Allowance dated Mar. 11, 2025 issued in U.S. Appl. No. 18/411,538.
Notice of Allowance dated Mar. 25, 2025 issued in U.S. Appl. No. 16/992,810.
Notice of Allowance dated Mar. 24, 2025 issued in U.S. Appl. No. 17/893,614.
Notice of Allowance dated Mar. 26, 2025 issued in U.S. Appl. No. 18/352,407.
Notice of Allowance dated Apr. 14, 2025 issued in U.S. Appl. No. 16/049,450.
Brazilian Office Action issued in Application No. 1120200104191, dated Apr. 8, 2025, with English translation.
Notice of Allowance dated Jul. 22, 2025 issued in U.S. Appl. No. 18/480,586.

* cited by examiner

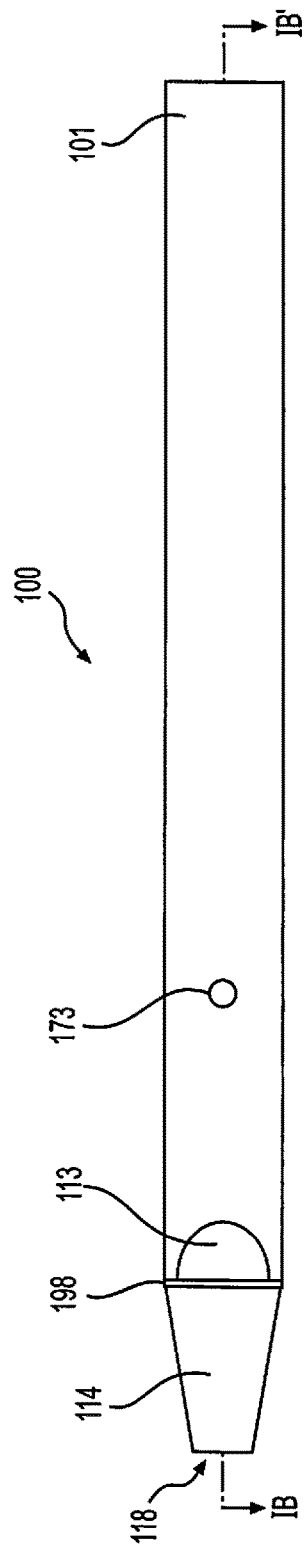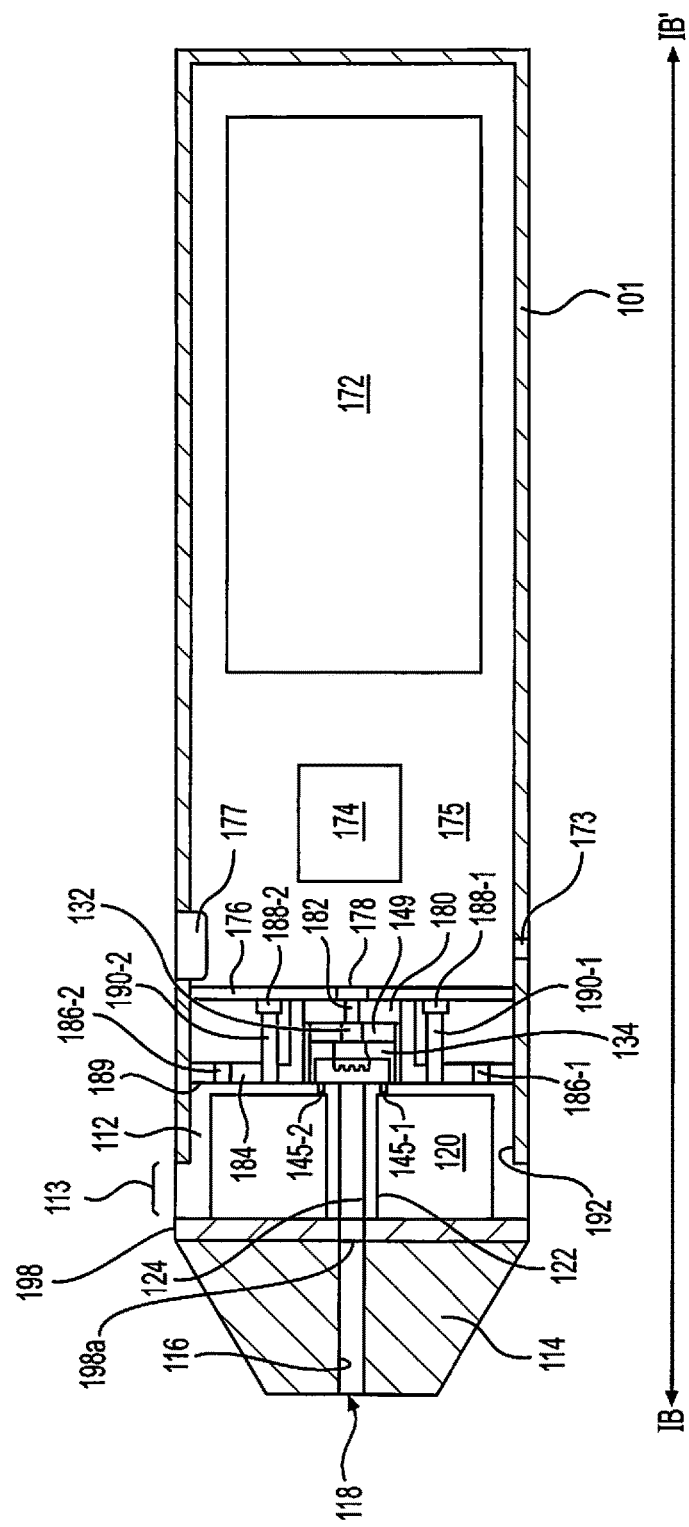

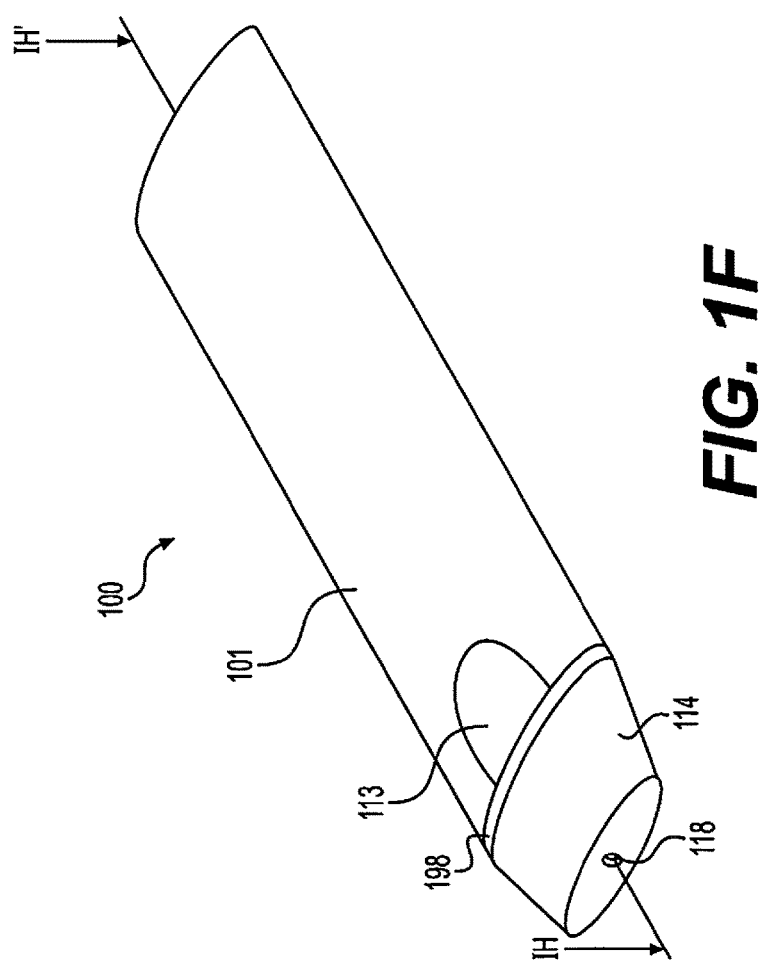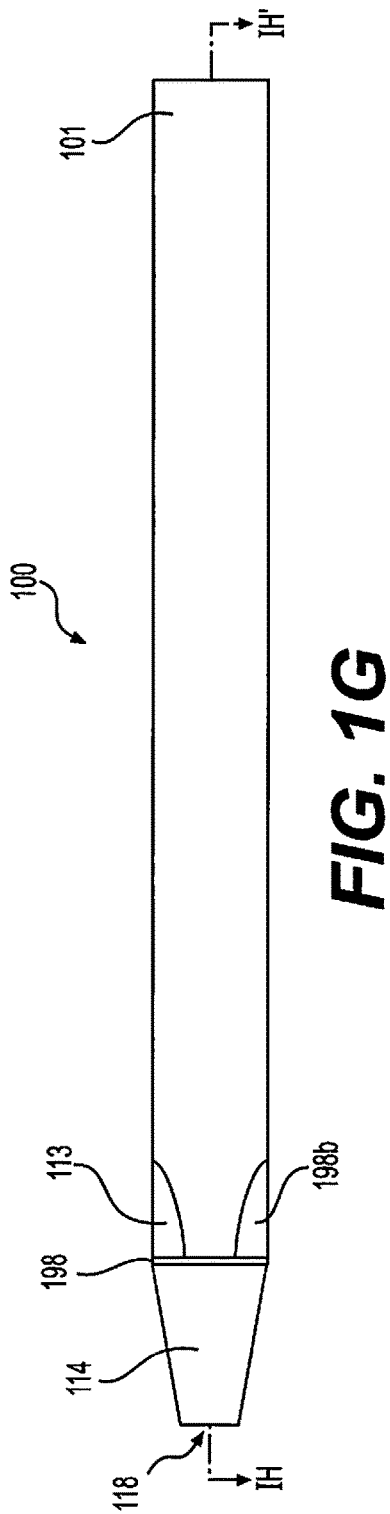

ELECTRONIC VAPING DEVICE

BACKGROUND

Field

The present disclosure relates to electronic vaping devices, e-vaping devices, and/or non-combustible vaping devices.

Description of Related Art

An e-vaping device includes a heating element which vaporizes a pre-vapor formulation to generate a "vapor," sometimes referred to herein as a "generated vapor."

The e-vaping device includes a power supply, such as a rechargeable battery, arranged in the device. The battery is electrically connected to the vapor generator, such that the heating element therein heats to a temperature sufficient to convert a pre-vapor formulation to a generated vapor. The generated vapor exits the e-vaping device through an outlet assembly that includes an outlet.

SUMMARY

According to some example embodiments, an e-vaping device may include a cartridge and a power supply assembly. The cartridge may include a reservoir housing at least partially defining a reservoir, the reservoir configured to hold a pre-vapor formulation, and a vaporizer assembly configured to draw the pre-vapor formulation from the reservoir and to heat the drawn pre-vapor formulation to form a vapor. The power supply assembly may be configured to supply electrical power, including to the cartridge to cause the vaporizer assembly to form the vapor. The power supply assembly may include a power supply configured to supply the electrical power, a coupling interface configured to electrically couple the power supply to the vaporizer assembly, a light-emitting device configured to emit light, and a light tube structure having a proximate end and a distal end, the proximate end adjacent to the light-emitting device, the distal end extending through the coupling interface. The light tube structure may be configured to channel the emitted light from the proximate end of the light tube structure to the distal end of the light tube structure, such that the light tube structure is configured to emit the channeled light into the reservoir housing of the cartridge to cause at least a portion of the cartridge to emit at least a portion of the channeled light to an external environment.

The light tube structure may be configured to emit the channeled light into the reservoir of the cartridge, via the reservoir housing, to illuminate pre-vapor formulation held in the reservoir to the external environment.

The reservoir housing may be configured to channel the channeled light through an interior of the reservoir housing to be emitted to the external environment via at least a portion of the reservoir housing that is exposed by a housing of the power supply assembly.

At least a portion of the reservoir housing may be transparent to visible light.

The portion of the reservoir housing may be transparent to visible light in a direction that is substantially perpendicular to a longitudinal axis of the cartridge.

The light-emitting device may be configured to emit light having a selected set of light properties of a plurality of sets of light properties.

The e-vaping device may further include control circuitry configured to identify a cartridge property associated with the cartridge and control the light-emitting device to emit light including a light property associated with the identified cartridge property.

The control circuitry may be configured to identify the cartridge property based on determining a value of a particular instance of information associated with the cartridge.

The particular instance of information associated with the cartridge may be a particular electrical resistance associated with the cartridge.

The power supply assembly and the cartridge may be configured to be removably coupled together.

The e-vaping device may further include one or more magnets configured to magnetically couple the power supply assembly and the cartridge together.

The one or more magnets may be included in the power supply assembly.

The one or more magnets may be included in the coupling interface of the power supply assembly.

The one or more magnets may be included in the cartridge.

The power supply may include a rechargeable battery.

According to some example embodiments, a power supply assembly for an e-vaping device may include a power supply configured to supply electrical power, a coupling interface configured to couple with a cartridge to configure the e-vaping device to generate a vapor, a light-emitting device configured to emit light, and a light tube structure having a proximate end and a distal end, the proximate end adjacent to the light-emitting device, the distal end extending through the coupling interface. The cartridge may include a reservoir housing at least partially defining a reservoir holding a pre-vapor formulation and a vaporizer assembly configured to heat pre-vapor formulation drawn from the reservoir to generate the vapor. The coupling interface may be configured to electrically couple the power supply to the vaporizer assembly. The light tube structure may be configured to channel the emitted light from the proximate end of the light tube structure to the distal end of the light tube structure, such that the light tube structure is configured to emit the channeled light into the reservoir housing of the cartridge to cause at least a portion of the cartridge to emit at least a portion of the channeled light to an external environment.

The light tube structure may be configured to emit the channeled light into the reservoir of the cartridge, via the reservoir housing, to illuminate pre-vapor formulation held in the reservoir to the external environment.

The reservoir housing may be configured to channel the channeled light through an interior of the reservoir housing to be emitted to the external environment via at least a portion of the reservoir housing that is transparent, exposed by a housing of the power supply assembly, or both transparent and exposed by the housing.

The light-emitting device may be configured to emit light having a selected set of light properties of a plurality of sets of light properties.

The power supply assembly may further include control circuitry configured to identify a cartridge property associated with the cartridge and control the light-emitting device to emit light including a light property associated with the identified cartridge property.

The control circuitry may be configured to identify the cartridge property based on determining a value of a particular instance of information associated with the cartridge.

The particular instance of information associated with the cartridge may be a particular electrical resistance associated with the cartridge.

The power supply assembly may further include one or more magnets configured to magnetically couple the power supply assembly to the cartridge.

The one or more magnets may be included in the power supply assembly.

The one or more magnets may be included in the coupling interface of the power supply assembly.

The one or more magnets may be included in the cartridge.

According to some example embodiments, a method for operating an e-vaping device may include identifying a particular set of cartridge properties associated with a cartridge coupled to a power supply assembly based on determining a particular instance of information associated with the cartridge, the cartridge including a reservoir housing at least partially defining a reservoir holding a pre-vapor formulation and a vaporizer assembly configured to generate a vapor based on heating pre-vapor formulation drawn from the reservoir. The method may include controlling a light-emitting device to emit light having a particular set of light properties associated with the identified particular set of cartridge properties, such that the light is channeled through a light tube structure and is emitted into the reservoir housing of the cartridge to cause at least one portion of the cartridge to emit at least a portion of the channeled light to an external environment.

The identifying may include determining that a value of the particular determined instance of information associated with the cartridge corresponds with a value of a particular stored instance of information of a plurality of stored instances of information in a database, the particular stored instance of information associated with a stored set of light properties. The controlling the light-emitting device may include identifying the stored set of light properties associated with the particular stored instance of information as the particular set of light properties associated with the identified particular set of cartridge properties.

The particular instance of information may be a particular resistance associated with the cartridge.

The plurality of stored instances of information stored in the database may include a plurality of stored resistances, and the value of the particular stored instance of information may be a value of a particular stored resistance value of the plurality of stored resistance.

The method may further include coupling the power supply assembly to the cartridge such that one or more magnets magnetically couple the power supply assembly to the cartridge.

The one or more magnets may be included in the power supply assembly.

The one or more magnets may be included in a coupling interface of the power supply assembly.

The one or more magnets may be included in the cartridge.

According to some example embodiments, an e-vaping device may include a cartridge and a power supply assembly. The cartridge may include a reservoir housing at least partially defining a reservoir, the reservoir configured to hold a pre-vapor formulation, and a vaporizer assembly configured to draw the pre-vapor formulation from the reservoir and to heat the drawn pre-vapor formulation to form a vapor. The power supply assembly may be configured to supply electrical power, including to the cartridge to cause the vaporizer assembly to form the vapor. The power supply assembly may include a power supply configured to supply the electrical power, a coupling interface configured to electrically couple the power supply to the vaporizer assembly, a light-emitting device configured to emit light, and a light tube structure having a proximate end and a distal end, the proximate end adjacent to the light-emitting device, the distal end extending through the coupling interface. The light tube structure may be configured to channel the emitted light from the proximate end of the light tube structure to the distal end of the light tube structure, such that the light tube structure is configured to emit the channeled light into the cartridge to cause at least a portion of the cartridge to emit at least a portion of the channeled light to an external environment.

The light-emitting device may be configured to emit light having a selected set of light properties of a plurality of sets of light properties.

The e-vaping device may further include control circuitry configured to identify a cartridge property associated with the cartridge and control the light-emitting device to emit light including a light property associated with the identified cartridge property.

The control circuitry may be configured to identify the cartridge property based on determining a value of a particular instance of information associated with the cartridge.

The particular instance of information associated with the cartridge may be a particular electrical resistance associated with the cartridge.

The power supply assembly and the cartridge may be configured to be removably coupled together.

The e-vaping device may further include one or more magnets configured to magnetically couple the power supply assembly and the cartridge together.

The one or more magnets may be included in the power supply assembly.

The one or more magnets may be included in the coupling interface of the power supply assembly.

The one or more magnets may be included in the cartridge.

The power supply may include a rechargeable battery.

According to some example embodiments, a power supply assembly for an e-vaping device may include a power supply configured to supply electrical power, a coupling interface configured to couple with a cartridge to configure the e-vaping device to generate a vapor, a light-emitting device configured to emit light, and a light tube structure having a proximate end and a distal end, the proximate end adjacent to the light-emitting device, the distal end extending through the coupling interface. The cartridge may include a reservoir housing at least partially defining a reservoir holding a pre-vapor formulation and a vaporizer assembly configured to heat pre-vapor formulation drawn from the reservoir to generate the vapor. The coupling interface may be configured to electrically couple the power supply to the vaporizer assembly. The light tube structure may be configured to channel the emitted light from the proximate end of the light tube structure to the distal end of the light tube structure, such that the light tube structure is configured to emit the channeled light into the cartridge to cause at least a portion of the cartridge to emit at least a portion of the channeled light to an external environment.

The light-emitting device may be configured to emit light having a selected set of light properties of a plurality of sets of light properties.

The power supply assembly may further include control circuitry configured to identify a cartridge property associated with the cartridge and control the light-emitting device to emit light including a light property associated with the identified cartridge property.

The control circuitry may be configured to identify the cartridge property based on determining a value of a particular instance of information associated with the cartridge.

The particular instance of information associated with the cartridge may be a particular electrical resistance associated with the cartridge.

The power supply assembly may further include one or more magnets configured to magnetically couple the power supply assembly to the cartridge.

The one or more magnets may be included in the power supply assembly.

The one or more magnets may be included in the coupling interface of the power supply assembly.

The one or more magnets may be included in the cartridge.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIG. 1A is a side view of an e-vaping device, according to some example embodiments;

FIG. 1B is a longitudinal cross-sectional view along line IB-IB' of the e-vaping device of FIG. 1A, according to some example embodiments;

FIG. 1F is a perspective view of an e-vaping device, according to some example embodiments;

FIG. 1G is a side view of the e-vaping device of FIG. 1F, according to some example embodiments;

DETAILED DESCRIPTION OF EXAMPLE EMBODIMENTS

Figure 1C:
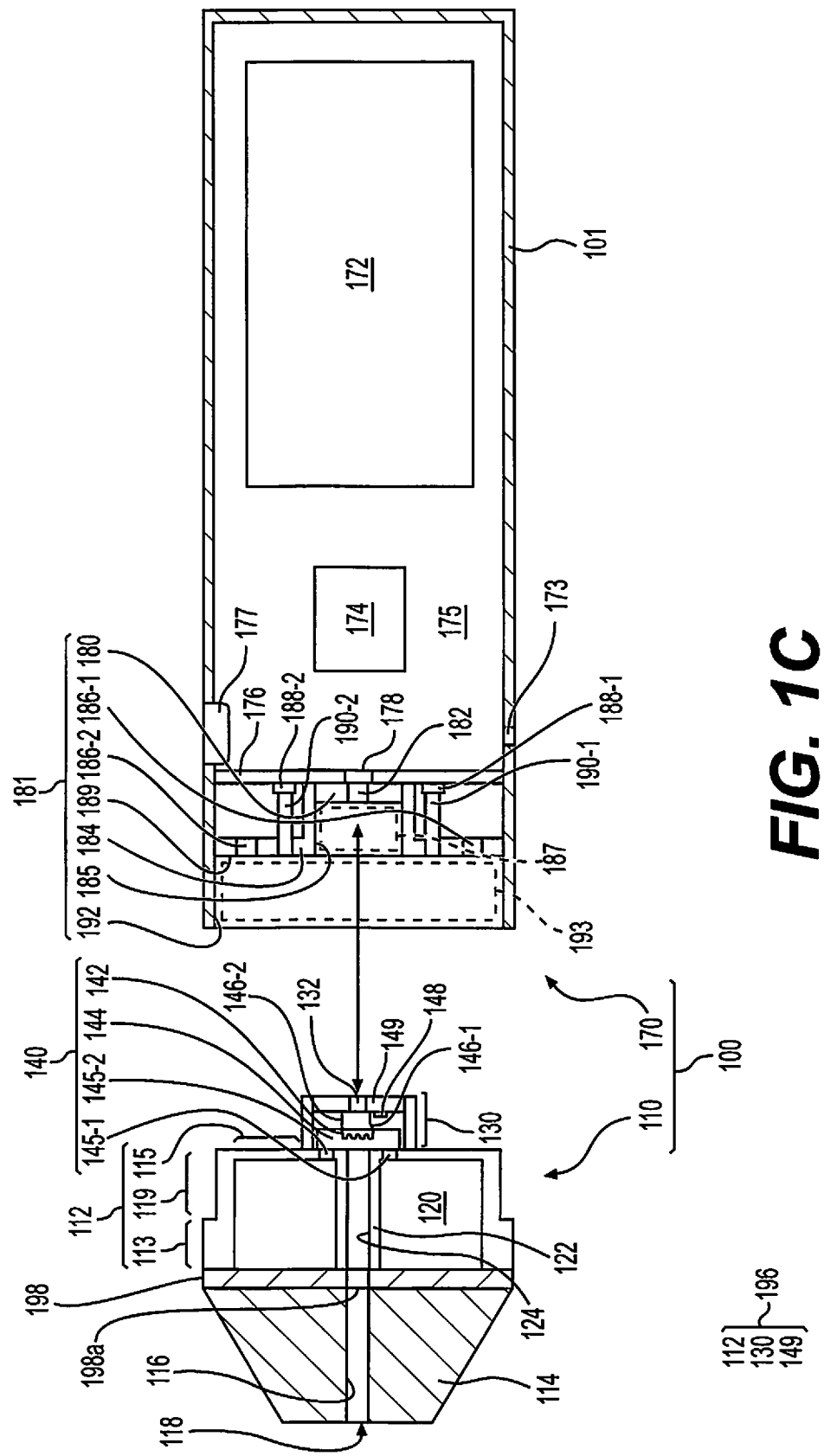
FIG. 1C is an expanded longitudinal cross-sectional view along line IB-IB' of the e-vaping device of FIG. 1A, according to some example embodiments.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives thereof. Like numbers refer to like elements throughout the description of the figures.

It should be understood that when an element or layer is referred to as being "on," "connected to," "adjacent to," "coupled to," or "covering" another element or layer, it may be directly on, connected to, adjacent to, coupled to, or covering the other element or layer, or a space may exist between the elements or layers, or intervening elements or layers may be present. In contrast, when an element is referred to as being "directly on," "directly connected to," or "directly coupled to" another element or layer, there are no intervening spaces, elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of example embodiments. As such, variations from the shapes of the illustrations are to be expected. Thus, example embodiments should not be construed as limited to the shapes of regions illustrated herein but are to include deviations in shapes.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

When the terms "about" or "substantially" are used in this specification in connection with a numerical value, it is intended that the associated numerical value include a tolerance of ±10% around the stated numerical value. The expression "up to" includes amounts of zero to the expressed upper limit and all values therebetween. When ranges are specified, the range includes all values therebetween. Moreover, when the words "generally" and "substantially" are used in connection with geometric shapes, it is intended that precision of the geometric shape is not required but that latitude for the shape is within the scope of the disclosure. Although tubular elements of example embodiments may be cylindrical, other tubular cross-sectional forms are contemplated, such as square, rectangular, oval, triangular and others.

As referred to herein, a "vapor" is any matter generated or outputted from any e-vaping device according to any of the example embodiments disclosed herein.

Figure 1D:
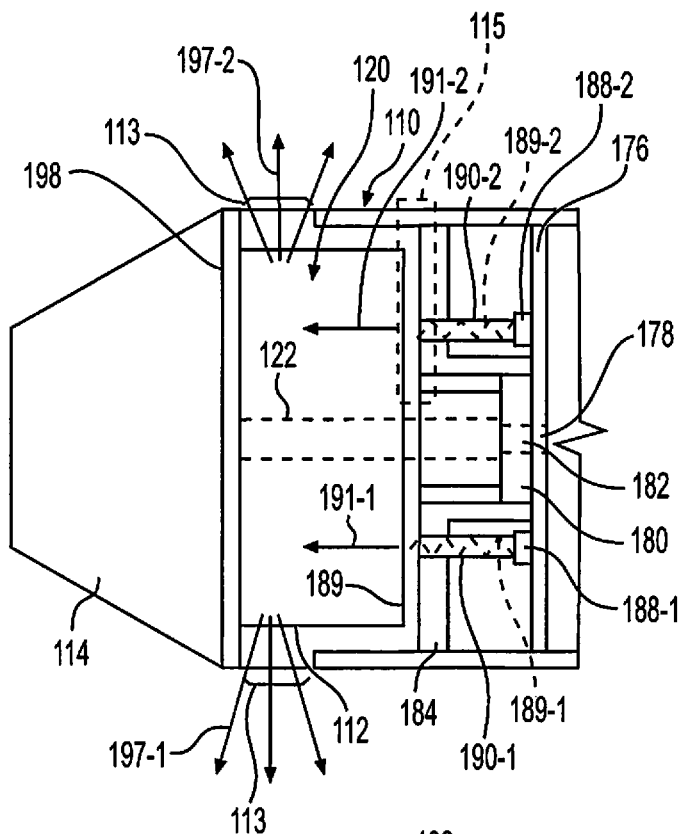
FIG. 1D is a longitudinal cross-sectional view of an end of an e-vaping device, according to some example embodiments.
Figure 1E:
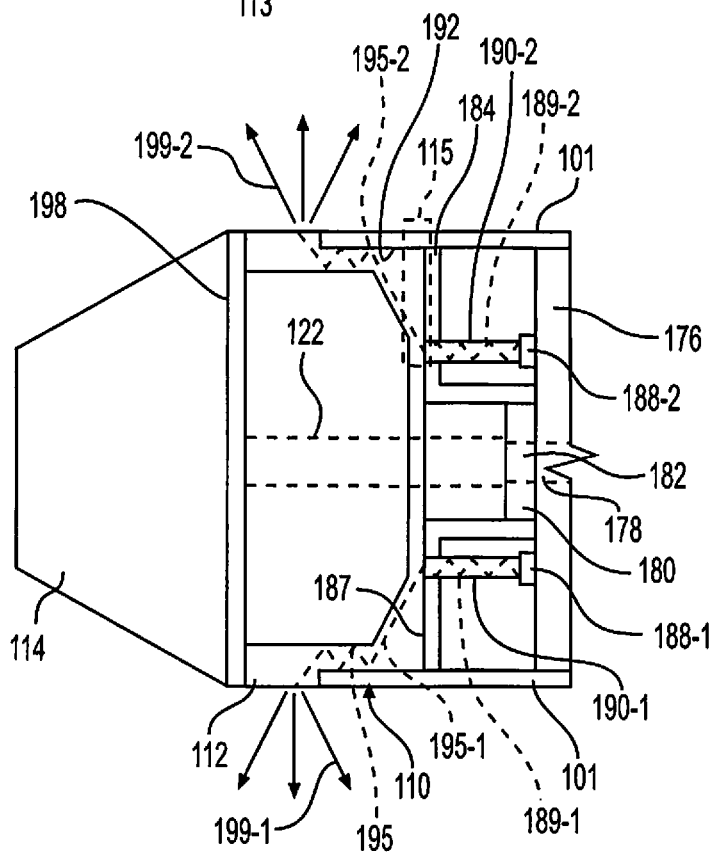
FIG. 1E is a longitudinal cross-sectional view of an end of an e-vaping device, according to some example embodiments.
Figure 1H:
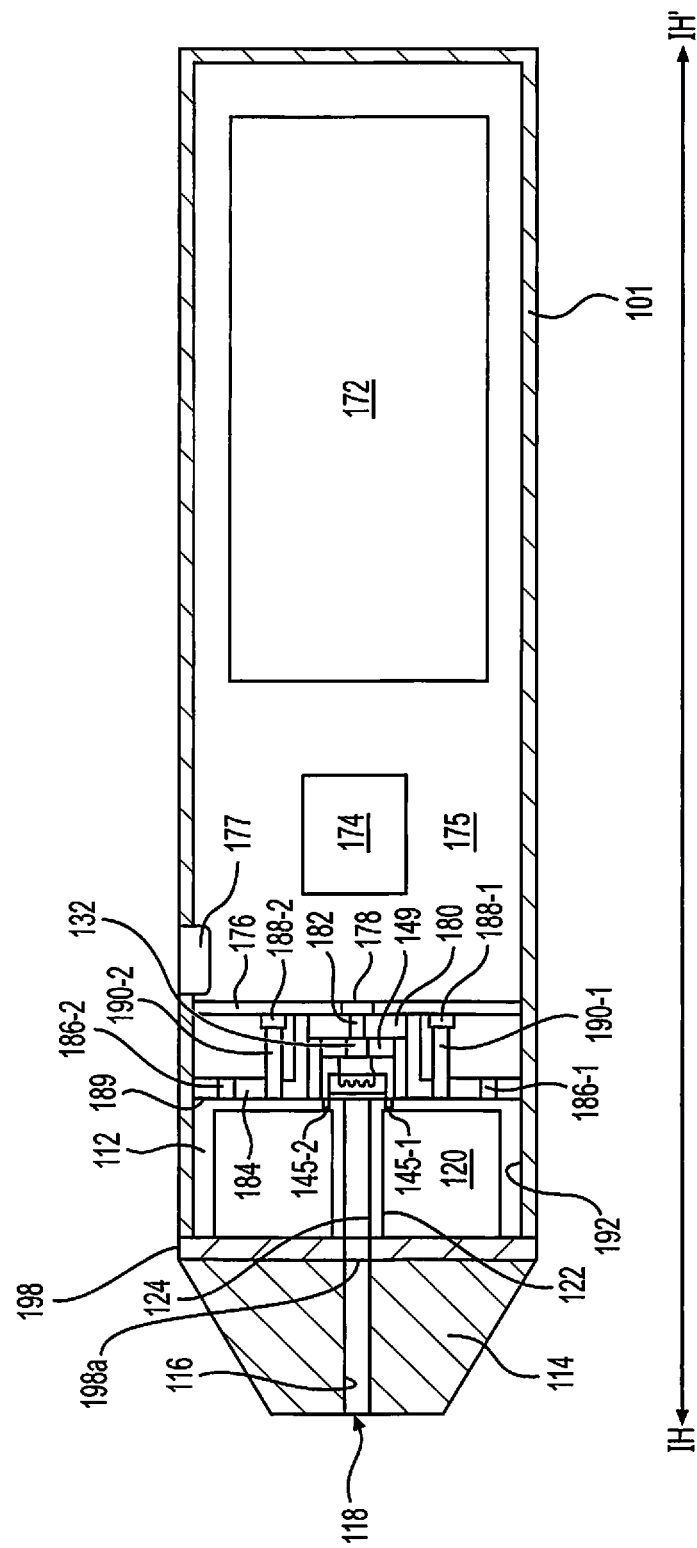
FIG. 1H is a longitudinal cross-sectional view along line IH-IH' of the e-vaping device of FIG. 1F, according to some example embodiments.
Figure 1I:
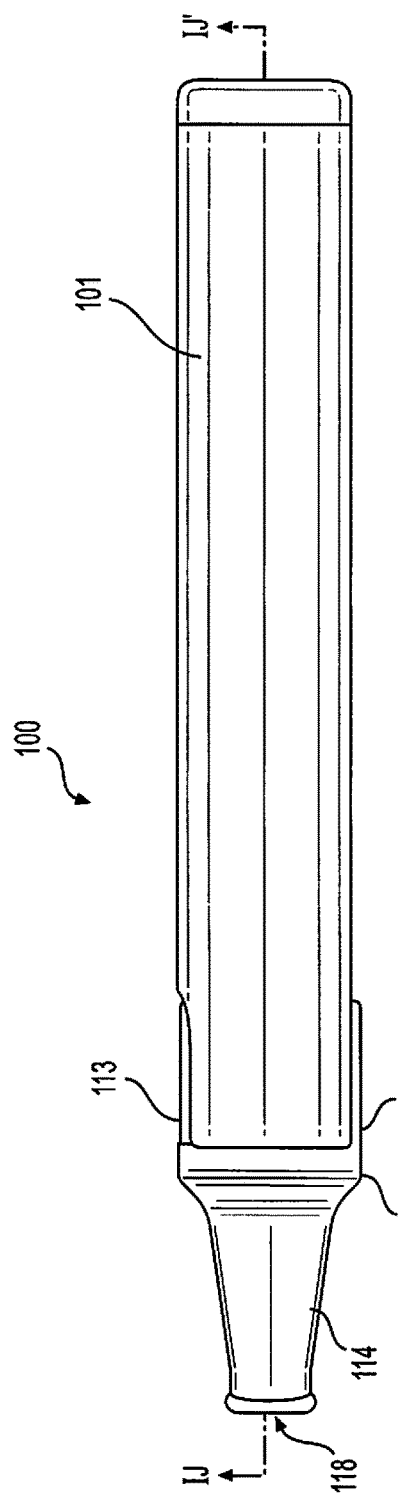
FIG. 1I is a side view of an e-vaping device, according to some example embodiments.
Figure 1J:
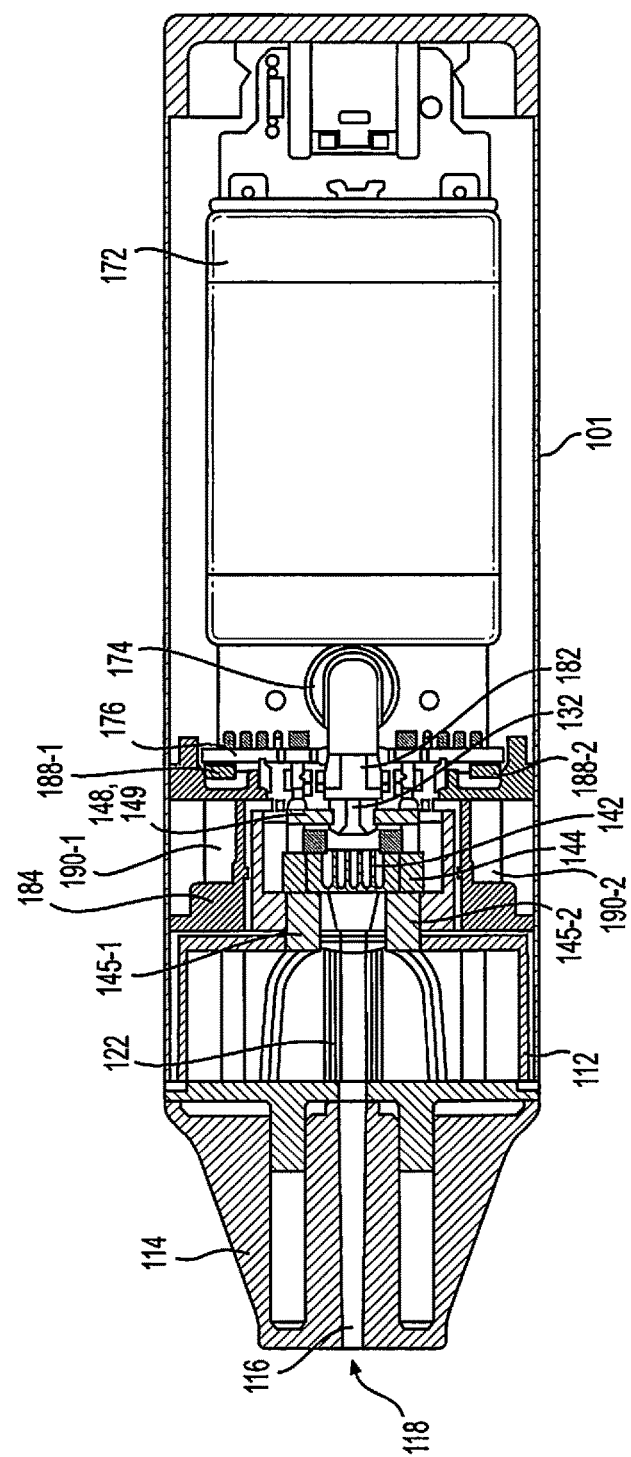
FIG. 1J is a cross-sectional view of the e-vaping device of FIG. 1I along cross-sectional view line IJ-IJ', according to some example embodiments.
Figure 1K:
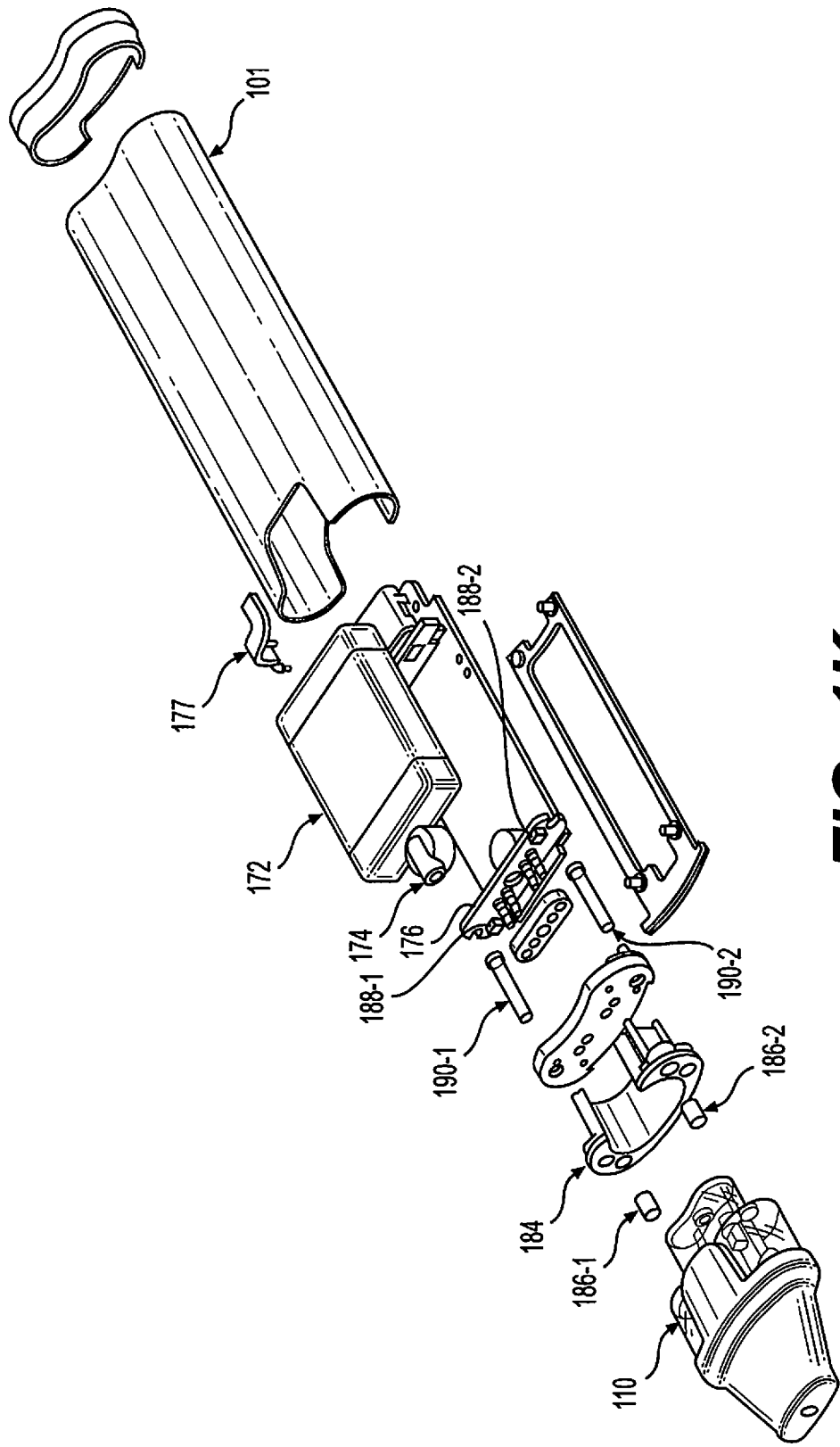
FIG. 1K is an expanded view of the e-vaping device of FIG. 1I, according to some example embodiments.
Figure 1N:
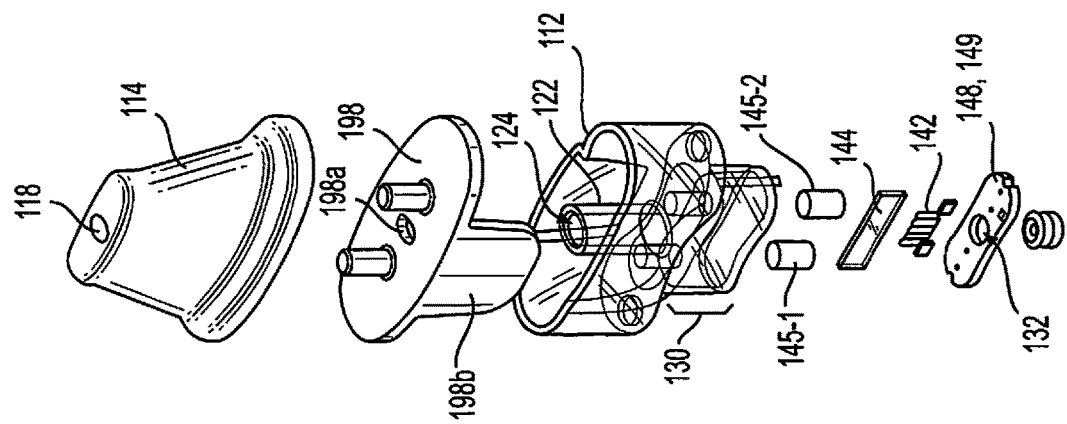
FIG. 1N is an expanded view of the cartridge of FIG. 1L, according to some example embodiments.
Figure 1M:
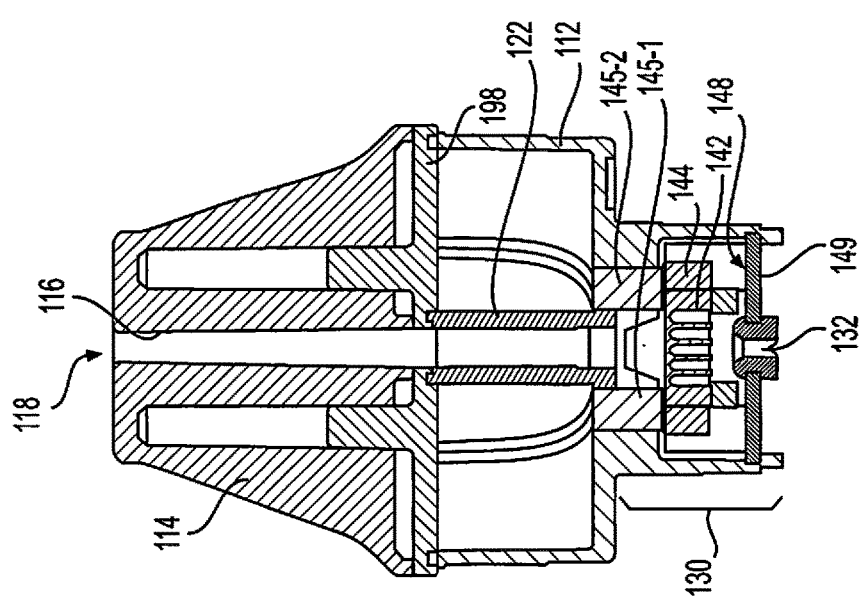
FIG. 1M is a cross-sectional view of the cartridge of FIG. 1L along cross-sectional view line IM-IM', according to some example embodiments.
Figure 1L:
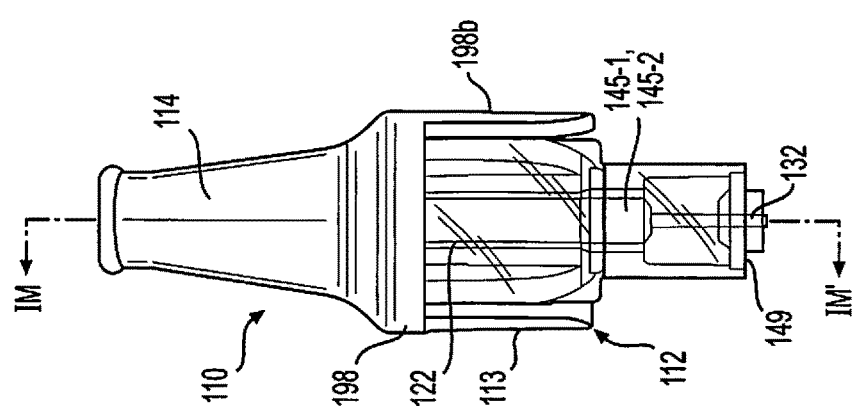
FIG. 1L is a side view of a cartridge for an e-vaping device, according to some example embodiments.

FIG. 1A is a side view of an e-vaping device 100, according to some example embodiments. FIG. 1B is a longitudinal cross-sectional view along line IB-IB' of the e-vaping device 100 of FIG. 1A, according to some example embodiments. FIG. 1C is an expanded view of e-vaping device 100 of FIG. 1A, according to some example embodiments. FIG. 1D is a longitudinal cross-sectional view of a distal end of an e-vaping device, according to some example embodiments. FIG. 1E is a longitudinal cross-sectional view of a distal end of an e-vaping device, according to some example embodiments. FIG. 1F is a perspective view of an e-vaping device, according to some example embodiments. FIG. 1G is a side view of the e-vaping device of FIG. 1F, according to some example embodiments. FIG. 1H is a longitudinal cross-sectional view along line IH-IH' of the e-vaping device of FIG. 1F, according to some example embodiments. FIG. 1I is a side view of an e-vaping device, according to some example embodiments. FIG. 1J is a cross-sectional view of the e-vaping device of FIG. 1I along cross-sectional view line IJ-IJ', according to some example embodiments. FIG. 1K is an expanded view of the e-vaping device of FIG. 1I, according to some example embodiments. FIG. 1L is a side view of a cartridge for an e-vaping device, according to some example embodiments. FIG. 1M is a cross-sectional view of the cartridge of FIG. 1L along cross-sectional view line IM-IM', according to some example embodiments. FIG. 1N is an expanded view of the cartridge of FIG. 1L, according to some example embodiments.

In some example embodiments, as shown in FIGS. 1A-1C, an electronic vaping device (e-vaping device) 100 may include a replaceable cartridge (or first section) 110, sometimes referred to herein as an "e-vaping tank," and a reusable battery section (or second section, also referred to herein as a power supply assembly) 170, which may be coupled together at respective coupling interfaces 181, 196 to configure the e-vaping device 100 to generate a vapor. The cartridge 110 includes a reservoir 120 holding a pre-vapor formulation and a vaporizer assembly 140 configured to heat pre-vapor formulation drawn from the reservoir 120 to generate the vapor. The power supply assembly 170 includes a power supply 172 and is configured to, when coupled to the cartridge 110, supply electrical power to the vaporizer assembly 140 to enable the vaporizer assembly 140 to generate the vapor.

Referring back to FIGS. 1A-1C, the power supply assembly 170 and cartridge 110 may be coupled together via respective coupling interfaces 181, 196 to comprise the e-vaping device 100. As shown in FIG. 1C, the coupling interface 181 may include interface 180, interface structure 184, the inner surface 192 of housing 101, one or more magnets 186-1, 186-2, inner surface 185 of the interface structure 184, and/or outer surface 189 of the interface structure 184. As further shown in FIG. 1C, the coupling interface 196 may include interface 149, reservoir housing 112, and/or vapor generator assembly 130. The coupling interfaces 181, 196 may be configured to be removably coupled together, such that the power supply assembly 170 and the cartridge 110 are configured to be removably coupled together. It should be appreciated that each coupling interface (also referred to herein as a connector) of the coupling interfaces 181, 196 may include any type of interface, including a snug-fit, detent, clamp, bayonet, sliding fit, sleeve fit, alignment fit, threaded connector, magnetic, clasp, or any other type of connection, and/or combinations thereof. In the example embodiments shown in FIGS. 1B-1C, respective inlets 182, 132 extend through the respective coupling interfaces 181, 196 to enable air to be drawn into the cartridge 110 from the external environment ("ambient environment"). In some example embodiments, the air is drawn via an interior of the power supply assembly 170. In some example embodiments, inlet 182 and/or inlet 178 may be omitted from the e-vaping device 100, and the e-vaping device 100 may include an inlet 173 that extends through at least a portion of the cartridge 110 and/or at least a portion of the power supply assembly 170 to be in fluid communication with inlet 132. For example, the inlet 173 may extend through the power supply assembly 170, from an external ambient environment, to cavity 187. The inlet 173 may be part of the coupling interface 181, may extend through a portion of housing 101 that is distal from the power supply 172 in relation to the control circuitry, and/or part of the cartridge 110. The sensor 174 may be located in fluid communication with the inlet 173, for example the sensor 174 may at least partially define cavity 187. In some example embodiments, coupling the coupling interface 196 of cartridge 110 with the coupling interface 181 of the power supply assembly 170 includes coupling the interface 149 of the coupling interface 196 with the interface 180 of the coupling interface 181.

As shown in FIGS. 1A-1C, the cartridge 110 may include a reservoir housing 112 at least partially defining a reservoir 120, a vapor generator assembly 130, and an outlet assembly 114. As illustrated herein, the vapor generator assembly 130 is shown to protrude from the reservoir 120, but example embodiments are not limited thereto: in some example embodiments, an end of the vapor generator assembly 130 that is distal to outlet 118 is flush or substantially flush (e.g., flush within manufacturing tolerances and/or material tolerances) with an end of the reservoir housing 112 that is distal to outlet 118, an end of the vapor generator assembly 130 that is proximal to outlet 118 is flush or substantially flush with an end of the reservoir housing 112 that is proximal to outlet 118, and/or vapor generator assembly 130 may be in whole or in part within a space occupied by reservoir housing 112. In some example embodiments, vapor generator assembly 130 may form in whole or in part an inner tubular element of reservoir housing 112, defining in whole or in part reservoir 120 between outside walls of 130 and inside walls of 112.

In some example embodiments, including the example embodiments shown in at least FIGS. 1L-1N, a separate housing that is separate from the reservoir housing 112 may define the vapor generator assembly 130 and may be directly or indirectly coupled to the reservoir housing 112. In some example embodiments, including the example embodiments shown in at least FIGS. 1L-1N, the one or more transfer pads 145-1, 145-2 may extend through both a portion of the reservoir housing 112 and a portion of the separate housing of the vapor generator assembly 130. In some example embodiments, the vapor generator assembly 130 may be fixedly coupled to the reservoir housing 112. In other example embodiments, the vapor generator assembly 130 may be removable from and/or detachably coupled to the reservoir housing 112. In some example embodiments, one or more seals and/or gaskets may be between the coupled housings.

The cartridge 110 may include a structural element (also referred to herein as an inner tube 122) within a space at least partially defined by the reservoir housing 112. The reservoir housing 112 and the inner tube 122 may each be configured to at least partially define the reservoir 120. For example, as shown in FIGS. 1B-1C, an inner surface of reservoir housing 112 may define an outer boundary of reservoir 120. In another example, as shown, an outer surface of inner tube 122 may define an inner boundary of reservoir 120. As shown, the reservoir 120 may be defined as a space between an outer surface of inner tube 122 and an inner surface of reservoir housing 112. In some example embodiments, vapor generator assembly 130, in whole or in part, may form a part of inner tube 122.

In some example embodiments, a cap structure 198 may be coupled to ends of reservoir housing 112 and inner tube 122 that are proximal to outlet 118 and thus complete the enclosure of the reservoir 120. As shown, cap structure 198 may be further coupled to an outlet assembly 114, and cap structure 198 may include a port 198a extending therethrough which is configured to enable fluid communication between the interior of inner tube 122 (e.g., channel 124) and channel 116 of outlet assembly 114. In some example embodiments, cap structure 198 may be fixedly coupled to outlet assembly 114 and/or to reservoir housing 112. In some example embodiments, cap structure 198 may be detachably coupled to the outlet assembly 114, thereby enabling the outlet assembly 114 to be coupled or detached from a remainder of the e-vaping device 100 without further exposing the reservoir 120. In some example embodiments, reservoir housing 112 and inner tube 122 can be parts of a unitary piece (i.e., parts of a single piece). In some example embodiments, reservoir housing 112 and cap structure 198 can be parts of a unitary piece. In some example embodiments, inner tube 122 and cap structure 198 can be parts of a unitary piece. In some example embodiments, cap structure 198, reservoir housing 112 and/or inner tube 122 can be individual parts coupled together, or parts of a unitary piece.

In further example embodiments, cap structure 198 and outlet assembly 114 can be parts of a unitary piece. In further example embodiments, cap structure 198 and reservoir housing 112 can be parts of a unitary piece. In other words, cap structure 198 may simply be a part of outlet assembly 114 or of reservoir housing 112, or all may be parts of the same unitary piece. In yet further example embodiments, outlet assembly 114, cap structure 198, reservoir housing 112 and/or inner tube 122 can be individual parts coupled together, or parts of a unitary piece.

As shown in at least FIGS. 1H and 1I-1N, the cap structure 198 may include a protruding structure 198b that is configured to be engaged with a particular portion of the housing 112 that is complementary to the size and shape of the protruding structure 198b, such that the cap structure 198 is configured to be coupled to the reservoir housing 112 in a particular alignment that corresponds with protruding structure 198b engaging with the complementary portion of the reservoir housing 112.

The inner surface of inner tube 122 at least partially defines a channel 124. As shown in FIGS. 1B-1C, the inner tube 122 may extend through at least one end of the reservoir housing 112 so that the channel 124 is in fluid communication with vaporizer assembly 140 within an interior of the vapor generator assembly 130, inlet 132, and outlet 118.

Still referring to FIGS. 1B-1C, the vapor generator assembly 130 includes a vaporizer assembly 140 configured to draw pre-vapor formulation from the reservoir 120 and to heat the drawn pre-vapor formulation to generate a vapor. The vaporizer assembly 140 may include one or more transfer pads 145-1, 145-2 that extend through at least one structure that at least partially defines the reservoir 120. In some example embodiments, transfer pads 145-1 and 145-2 may also extend through at least one structure that at least partially defines the vapor generator assembly 130. In some example embodiments, as shown in FIGS. 1B-1C, vapor generator assembly 130 includes transfer pads 145-1 and 145-2 that extend through an end portion 115 of reservoir housing 112, where the end portion 115 of reservoir housing 112 at least partially defines an end of reservoir 120 and/or an end of vapor generator assembly 130, so that the transfer pads 145-1 and 145-2 are in fluid communication with the reservoir 120. Each transfer pad 145-1 and 145-2 is configured to draw pre-vapor formulation from the reservoir 120 at the respective ends that are inside the reservoir, and through an interior of the respective transfer pads 145-1 and 145-2 to respective opposite ends thereof. In some example embodiments, including the example embodiments shown in at least FIGS. 1B-1C, the transfer pads 145-1 and 145-2 may be cylindrical in shape, but it will be understood that other shapes and sizes of the transfer pads 145-1 and 145-2 may be possible. For example, the transfer pads may be flat and/or may have other cross-sectional forms such as square, rectangular, oval, triangular, irregular, others, etc. and/or combinations thereof). Each transfer pad may also have a different shape. In some example embodiments, one or more of the transfer pads may have a cylindrical shape such that the one or more transfer pads is about 2.5 mm in diameter and about 4.0 in height. Any other dimensions may be used depending on the application. In some example embodiments, one or more of the transfer pads may at least partially comprise polyethylene terephthalate (PET), polypropylene (PP), a mixture of PET and PP, or the like. In some example embodiments, the transfer pads may be made of ("may at least partially comprise") any materials with capabilities to transfer pre-vapor formulation from one location to another either through wicking or through other mechanisms. In some example embodiments, only one transfer pad may be used, or more than two transfer pads may be used.

The vaporizer assembly 140 further includes a dispensing interface 144 (e.g., a "wick") and a heating element 142. The dispensing interface 144 is in contact with the respective ends of the one or more transfer pads 145-1, 145-2, such that pre-vapor formulation drawn from the reservoir 120 by the one or more transfer pads may be drawn through the one or more transfer pads to the dispensing interface 144. Thus, the dispensing interface 144 may draw pre-vapor formulation from the reservoir 120 via the one or more transfer pads 145-1, 145-2 (as noted above, less or more transfer pads may be used). The heating element 142 is configured to generate heat that heats the pre-vapor formulation drawn into the dispensing interface 144 from the reservoir 120 via the one or more transfer pads. In some example embodiments, the heating element 142 is in contact with the dispensing interface 144. In some example embodiments, the heating element is isolated from direct contact with the dispensing interface 144. In some example embodiments, one or more transfer pads and the dispensing interface can be individual parts that contact each other, or can be parts of a unitary piece. In some example embodiments, the heating element 142 may be on (e.g., may at least partially cover) one side of the dispensing interface 144. In some example embodiments, the heating element 142 may be on (e.g., may at least partially cover) each side of opposite sides of the dispensing interface 144. In some example embodiments, the heating element 142 may at least partially extend around (e.g., may at least partially wrap around) the dispensing interface.

In some example embodiments, the vapor generator assembly 130 includes a circuit 148 and an interface 149 that is configured to couple with an interface 180 of the power supply assembly 170. The interface 149 is configured to electrically couple the vaporizer assembly 140 and the circuit 148 with the power supply assembly 170 via interface 180 of the power supply assembly 170.

In some example embodiments, including the example embodiments shown in at least FIGS. 1B-1C, the interior 134 of vapor generator assembly 130 is at least partially defined by the same reservoir housing 112 that at least partially defines the reservoir 120. In some example embodiments, the interior 134 of vapor generator assembly 130 is at least partially defined by a different housing relative to reservoir housing 112, such that reservoir housing 112 does not at least partially define the interior 134 of vapor generator assembly 130.

The interface 149 includes an inlet 132 that extends through the interface 149, and may at least partially extend through the circuit 148, so that the vaporizer assembly 140 in the interior 134 of vapor generator assembly 130 is in fluid communication with an exterior of the cartridge 110 via the inlet 132. As shown in FIGS. 1B-1C, an end of the inner tube 122 may be in fluid communication with an interior 134 of the vapor generator assembly 130 and thus may be in fluid communication with the vaporizer assembly 140 located within the vapor generator assembly 130. Air entering the cartridge 110 via inlet 132 may flow through the interior 134 of the vapor generator assembly 130, in fluid communication with the vaporizer assembly 140, to flow into channel 124 defined by inner tube 122.

Referring to FIGS. 1B-1C, the e-vaping device 100 includes electrical pathways 146-1 and 146-2 that may electrically couple the heating element 142 to interface 149, thereby enabling the heating element 142 to be electrically coupled to power supply 172 based on interface 149 of cartridge 110 being coupled with interface 180 of power supply assembly 170. The electrical pathways 146-1 and 146-2 may include one or more electrical connectors.

If and/or when interfaces 149 and 180 are coupled together, one or more electrical circuits ("pathways") through the cartridge 110 and the power supply assembly 170 may be established ("closed"). The established electrical circuits may include the vaporizer assembly 140, electrical pathways 146-1 and 146-2, circuit 148, interface 149, interface 180, control circuitry 176, power supply 172, sensor 174, light source 177 (e.g., a light-emitting diode ("LED")), and/or one or more light-emitting devices 188-1, 188-2. As described further herein, the light source 177 and/or the one or more light-emitting devices 188-1, 188-2 are configured to emit light having a selected one or more properties ("light properties") of a plurality of properties (e.g., a selected color of a plurality of colors, a selected brightness of a plurality of brightness levels, a selected pattern of a plurality of patterns, a selected duration of a plurality of durations, some combination thereof, or the like).

Referring now to the outlet assembly 114 as shown in FIGS. 1B-1C, the outlet assembly 114 includes a channel 116 extending therethrough to establish the outlet 118. In example embodiments where cap structure 198 is simply a part of outlet assembly 114, or a part of reservoir housing 112, or where cap structure 198 is omitted from the cartridge 110, the outlet assembly 114 may be coupled, at an end thereof, to reservoir housing 112 and/or inner tube 122, to couple channel 116 with inner tube 122, thereby enabling vapor to flow through the channel 124 of the inner tube 122 to the channel 116 to the outlet 118. In example embodiments where cap structure 198 is a separate piece in between outlet assembly 114 and reservoir housing 112, the outlet assembly 114 may be coupled to cap structure 198 at an end of cap structure 198, and cap structure 198 will be coupled on an opposing end to reservoir housing 112 and/or inner tube 122, to enable vapor to flow through 124, 198a and 116, to the outlet 118.

Referring now to cartridge 110 as a whole, in view of the above, the cartridge 110 may be configured to receive a flow of air into the vapor generator assembly 130 via inlet 132, generate a vapor at vaporizer assembly 140, enable the generated vapor to be entrained in the flow of air through the interior 134 of vapor generator assembly 130, direct the flow of air with generated vapor into the channel 124 from the vapor generator assembly 130, and direct the flow of air with generated vapor to flow uninterrupted through the channel 124 and channel 116 (and through 198a if 198 is a separate piece in between 112 and 114) to the exterior environment via outlet 118.

In some example embodiments, some or all of the reservoir housing 112 (such as, for example, portions 113, 119 and/or 115) is transparent to visible light. In some example embodiments, for example in response to cartridge 110 being inserted into the power supply assembly 170 such that the cartridge 110 is coupled to the power supply assembly 170, portion 113 of the reservoir housing 112 is transparent to visible light and remains externally-visible in relation to the e-vaping device 100, and may represent about 25% of the reservoir housing 112. In some example embodiments, such an externally-visible portion 113 of the coupled cartridge 110 may have a combined area of about 200 mm². Different sizes, shapes or proportions for portion 113 may be used depending on the desired effect. In some example embodiments, the outlet assembly 114 (and/or cap structure 198 if separate), may be opaque to visible light. In some example embodiments, the outlet assembly 114 (and/or cap structure 198 if separate) may be transparent to visible light. In some example embodiments, as explained above, the outlet assembly 114, cap structure 198 and/or reservoir housing 112 may be parts of a unitary piece, such that they collectively comprise an individual, continuous instance of material (e.g., transparent plastic). In some example embodiments, the inner tube 122 may be integrated with ("integral with") the reservoir housing 112, such that at least the reservoir housing 112 and inner tube 122 collectively comprise an individual, continuous instance of material (e.g., transparent plastic). In some example embodiments, the reservoir housing 112 extends continuously around at least a portion of the vapor generator assembly 130 and may at least partially define (e.g., in combination with interface 149) the outer boundary of the vapor generator assembly 130 and thus its interior 134. In some example embodiments, the vapor generator assembly 130 and/or reservoir housing 112 may be parts of a unitary piece, such that they collectively comprise an individual, continuous instance of material (e.g., transparent plastic).

As shown in FIGS. 1B-1E, the vapor generator assembly 130 may protrude from the proximate end of the reservoir, such that an outer boundary of the vapor generator assembly 130, in addition to interface 149, collectively at least partially comprise a projector-type coupling interface 196. As further shown in FIGS. 1B-1E, the reservoir housing 112 may include a narrowed portion 119 configured to be received into at least a portion of a cavity of the power supply assembly 170, such that at least a portion of the reservoir 120 enclosed by the reservoir housing 112 is configured to be received into the portion of the cavity of the power supply assembly 170. A portion 113 of the reservoir housing 112 may be configured to be exposed by the housing 101 of the power supply assembly 170 when cartridge 110 is coupled to power supply assembly 170 (portion 113 is also shown in FIG. 1A and FIGS. 1F-1G). As shown in FIGS. 1B-1E and FIGS. 1F-1G, the portion 113 of the reservoir housing 112 may protrude perpendicularly to the longitudinal axis of the cartridge 110, in relation to the narrowed portion 119 of the reservoir housing 112, so that the narrowed portion 119 may be configured to be inserted into a cavity 193 defined by an inner surface 192 of the housing 101 of the power supply assembly 170, and the protruding portion 113 of the reservoir housing 112 may be restricted by the housing 101 from being inserted into the cavity 193. In various example embodiments, there may be only one portion 113 on a side of the e-vaping device 100 (as shown in FIGS. 1A-1E), there may be only one portion 113 on a top or bottom side of the e-vaping device 100 (as shown in FIGS. 1F and 1G), there may be two portions 113 on opposing sides of the e-vaping device (as shown in FIG. 1C), there may be multiple portions 113 in various locations of reservoir housing 112, some combination thereof, or the like. In some example embodiments, portion 113 may be a portion that extends continuously around the reservoir housing 112 (e.g., around an entire circumference of the reservoir housing 112).

As described further below, and as shown in FIGS. 1D-1E, a portion 113 of the reservoir housing 112 may be configured to direct light from an interior of the cartridge 110 (e.g., light channeled through the interior of the reservoir housing 112 and/or light directed from the interior of the reservoir 120) to an exterior environment. In some example embodiments, a portion 113 of the reservoir housing 112 may be configured to direct light from an interior of the cartridge 110 such that light is emitted from the cartridge 110 (e.g., via the portion 113 of the reservoir housing 112) such that an external viewing angle of said light, from an exterior of the e-vaping device 100, includes an angle of about 45 degrees from an axis that extends perpendicular to the longitudinal axis of the cartridge 110. External viewing angles may be at least partially dependent upon external (e.g., ambient) lighting conditions. For example, external viewing angles may include angles greater than about 45 degrees, including in response to the external lighting conditions corresponding to a relative dark environment (e.g., nighttime), and external viewing angles may include angles that are less than about 45 degrees, including in response to external lighting conditions corresponding to a relative bright environment (e.g., in response to the e-vaping device 100 being exposed to direct sunlight). As referred to herein, an exterior environment may be an ambient environment.

As described further below, in some example embodiments the reservoir housing 112 may be configured to channel light through an interior of the reservoir housing 112 In some example embodiments, as shown in FIGS. 1D-1E, the reservoir housing 112 may receive light at an end portion 115 of the reservoir housing 112, and the light may be channeled through an interior of the reservoir housing 112 from the end portion 115 to at least the portion 113 thereof, for example, based on internal reflection and/or refraction of the light between surfaces of the reservoir housing 112, through a pre-vapor formulation within the housing 112, etc.

Still referring to FIGS. 1A-1C, the power supply assembly 170 of some example embodiments includes a housing 101 extending in a longitudinal direction, a sensor 174 responsive to air drawn into the power supply assembly 170 via an inlet 173 extending through the housing 101 to an interior 175 of the power supply assembly 170 from an exterior environment, power supply 172, control circuitry 176, light source 177, one or more light-emitting devices 188-1, 188-2, one or more light tube structures 190-1, 190-2, and coupling interface 181. As shown in FIG. 1C, the housing 101 may at least partially (e.g., in combination with at least control circuitry 176) define interior 175 of the power supply assembly 170. In FIGS. 1B-1C, the sensor 174 is shown to be in interior 175, but it will be understood that, in some example embodiments, the sensor 174 may be located between control circuitry 176 and cavity 193. Restated, a barrier (e.g., control circuitry 176) may be between sensor 174 and power supply 172.

As described further below, the power supply assembly 170 is configured to couple with the cartridge 110 to enable the resulting e-vaping device 100 to generate a vapor, based on electrically coupling the power supply 172 to the vaporizer assembly 140 to enable the power supply 172 to supply electrical power to the vaporizer assembly 140, thereby enabling the heating element 142 of the vaporizer assembly 140 to generate heat to vaporize pre-vapor formulation drawn into dispensing interface 144 from reservoir 120 via transfer pads 145-1 and 145-2 and dispensing interface 144 to form a generated vapor.

As shown in FIGS. 1B-1C, in some example embodiments, in addition to the housing 101 including an inlet 173, control circuitry 176 and interface 180 coupled thereto each include a respective inlet 178 and 182. Inlets 178 and 182 are aligned with each other and are in fluid communication with both interior 175 of housing 101 and cavity 187 which is configured to receive the vapor generator assembly 130 assembly that includes inlet 132. As a result, based on cartridge 110 being coupled to power supply assembly 170, inlets 173, 178, and 182 of power supply assembly 170 are in fluid communication with inlet 132 of cartridge 110 and thus in fluid communication with outlet 118. Therefore, when air is drawn through outlet 118 from the interior of the cartridge 110, air may be drawn into interior 175 from an external environment via inlet 173, and the air may be drawn from interior 175 into the interior of vapor generator assembly 130 via inlets 178, 182, and 132. Such air may then be drawn out of the e-vaping device 100 from vapor generator assembly 130 via channels 124 and 116, where said air may include vapor generated by vaporizer assembly 140.

As shown in at least FIGS. 1B and 1C, the inlet 173 may extend through a portion of the housing 101 that is proximate to power supply 172, in relation to the control circuitry 176, such that the inlet 173 extends from the external ambient environment to the interior 175 that is at least partially defined by housing 101 and control circuitry 176 and thus the inlet 173 is in fluid communication with interior 175 and interior 175 is in fluid communication with cavities via at least inlets 178 and 182. In some example embodiments, the inlet 173 may extend through a portion of the housing 101 that is distal to power supply 172, in relation to the control circuitry, such that the control circuitry 176 is between the inlet 173 and the interior 175, and further inlets 178 and 182 may be absent ("omitted") from power supply assembly 170, such that the interior 175 is partially and/or entirely isolated from being in fluid communication with inlet 173. For example, the inlet 173 may be included in the coupling interface 181 and may be isolated from interior 175, and at least the power supply 172 included therein, by at least control circuitry 176.

In some example embodiments, the inlet 173 is included in the cartridge 110 instead of the power supply assembly 170. For example, the inlet 173 may be included in the coupling interface 196.

In some example embodiments, the inlet 173 is included in and/or is defined by both coupling interfaces 181 and 196. For example, the coupling interfaces 196 and 181 may each include one or more portions that are structurally shaped to at least partially define the inlet, wherein the one or more portions of both coupling interfaces 196 and 181 may collectively define the inlet 173 (e.g., as a gap space defined between portions of the coupling interfaces 181 and 196) when cartridge 110 and power supply assembly 170 are coupled together via coupling of the coupling interfaces 181 and 196.

The power supply 172 may include a rechargeable battery. The rechargeable battery may be solar powered. The power supply 172 may be a Lithium-ion battery or one of its variants, for example a Lithium-ion polymer battery. The power supply 172 may be a nickel-metal hydride battery, a nickel cadmium battery, a lithium-manganese battery, a lithium-cobalt battery or a fuel cell. The e-vaping device 100 may be usable by an adult vaper until the energy in the power supply 172 is depleted or a minimum voltage cut-off level is achieved. Further, the power supply 172 may be rechargeable and may include circuitry configured to allow the battery to be chargeable by an external charging device and/or by external light. To recharge the e-vaping device 100, a Universal Serial Bus (USB) charger or other suitable connector or charger assembly may be used. Upon completion of the connection between the cartridge 110 and the power supply assembly 170, the power supply 172 may be electrically connected with the heating element 142 of the vaporizer assembly 140 upon actuation of the sensor 174.

In some example embodiments, the sensor 174 may be one or more of a pressure sensor, a microelectromechanical system (MEMS) sensor, etc. In some example embodiments, the sensor 174 may be any type of sensor configured to sense an air pressure drop. In some examples, the sensor 174 may be configured to sense an air pressure drop and initiate application of voltage from the power supply 172 to the heating element 142 of the vaporizer assembly 140. In addition, the inlet 173 may be located adjacent to the sensor 174, such that the sensor 174 may sense air flow indicative of vapor being drawn through the distal end of the e-vaping device 100 from the inlet 173. The sensor 174 may activate the power supply 172. It will be understood that the sensor 174 may not be adjacent to the inlet 173, but the sensor 174 may be configured to be in fluid communication with inlet 173. In some example embodiments, the sensor 174 may activate the light source 177 and/or the one or more light-emitting devices 188-1, 188-2.

As shown in at least FIGS. 1B and 1C, the sensor 174 may be in an interior 175 that is at least partially defined by housing 101 and control circuitry 176 and thus the sensor 174 may be in fluid communication with an inlet 173 that extends from the external ambient environment to interior 175. In some example embodiments, for example where the inlet 173 may extend through a portion of the housing 101 that is distal to power supply 172, in relation to the control circuitry, such that the control circuitry 176 is between the inlet 173 and the interior 175, and further inlets 178 and 182 may be absent ("omitted") from power supply assembly 170, the control circuitry 176 may further be between the sensor 174 and the interior 175, such that the sensor 174 is in fluid communication with inlet 173 and the sensor 174 is partially or entirely isolated from being in fluid communication with interior 175 by at least control circuitry 176.

In some example embodiments, the sensor 174 may also or alternatively be configured to generate an output indicative of a magnitude and/or direction of airflow (flowing through the vaporizer assembly 140), where the control circuitry 176 receives the sensor 174 output and determines if a direction of the airflow indicates a draw on the outlet 118 (versus air entering the e-vaping device 100 through the outlet 118), and/or a magnitude of the airflow exceeds a threshold value. In response to one or more of these conditions, the control circuitry 176 may selectively electrically connect the power supply 172 to the cartridge 110 and the vaporizer assembly 140, thereby activating both the cartridge 110 and the vaporizer assembly 140. In some example embodiments, the sensor 174 may generate an output indicative of a pressure drop within the housing of the e-vaping device 100, whereupon the control circuitry 176 activates the cartridge 110 and the vaporizer assembly 140, in response thereto. Further examples of a sensor are disclosed in "Electronic Smoke Apparatus," U.S. application Ser. No. 14/793,453, filed on Jul. 7, 2015, and "Electronic Smoke," U.S. Pat. No. 9,072,321, issued on Jul. 7, 2015, each of which is hereby incorporated by reference in their entirety into this document.

Referring to FIGS. 1B-1C, in some example embodiments the power supply assembly 170 may include a light source 177 that is configured to glow when the heating element 142 is activated (e.g., based on the power supply 172 actively supplying electrical power to the cartridge 110). The light source 177 may include a light emitting diode (LED). As shown, the light source 177 may extend through a portion of housing 101 (on a side of the housing 101, at an end of the housing 101, some combination thereof, or the like). The light source 177 may be coupled to the control circuitry 176.

In some example embodiments, the control circuitry 176 may include a time-period limiter. In some example embodiments, the control circuitry 176 may include a manually operable switch for an adult vaper to initiate heating. The time-period of the electric current supply to the heating element 142 of the vaporizer assembly 140 may be set or pre-set depending on the amount of pre-vapor formulation desired to be vaporized. In some example embodiments, the sensor 174 may detect a pressure drop and the control circuitry 176 may supply power to the heating element 142 as long as heater activation conditions are met. Such conditions may include one or more of the sensor 174 detecting a pressure drop that at least meets a threshold magnitude, the control circuitry 176 determining that a direction of the airflow in flow communication with the sensor 174 indicates a draw on the outlet assembly 114 (e.g., a flow through the outlet assembly 114 towards an exterior of the e-vaping device 100 from the channel 116) versus blowing (e.g., a flow through the outlet assembly 114 from an exterior of the e-vaping device 100 towards the channel 116), and/or the magnitude of the draw (e.g., flow velocity, volumetric flow rate, mass flow rate, some combination thereof, etc.) exceeds a threshold level. As described herein, the sensor 174 detecting a pressure drop, including detecting a pressure drop having a particular magnitude, may be understood to include the sensor 174 generating sensor data that, when processed by another element (e.g., the control circuitry 176), causes the other element to determine that the pressure drop is occurring, including determining that a pressure drop having a particular magnitude is occurring.

In some example embodiments, the control circuitry 176 may be configured to supply power to the heating element 142 for as long as a draw on the outlet assembly 114 is detected as presently occurring (e.g., for as long as sensor 174 continues to detect a pressure drop that at least meets a threshold magnitude associated with occurrence of a draw on the outlet assembly 114). In some example embodiments, the control circuitry 176 may be configured to selectively inhibit supply of power to the heating element 142, even where a draw on the outlet assembly 114 is detected as presently occurring, in response to a determination that a particular threshold value is reached. Such a particular threshold value may be a threshold determined duration of the draw on the outlet assembly 114 and/or a threshold determined temperature of one or more portions of the e-vaping device 100.

In an example, the control circuitry 176 may control the supply of electrical power to the light source 177 so that the light source 177 emits light, based on determining that electrical power is to be supplied to the heating element 142 to cause vapor to be generated and/or determining that one or more monitored e-vaping device properties at least meet one or more threshold values and/or are within one or more ranges.

Still referring to at least FIGS. 1B and 1D-1E, in some example embodiments, the control circuitry 176 is configured to control the supply of electrical power from power supply 172 to one or more light-emitting devices 188-1, 188-2 to cause the one or more light-emitting devices 188-1, 188-2 to emit light 189-1, 189-2.

In some example embodiments, the control circuitry 176 may, upon determining that vapor is to be generated based on data received from sensor 174, control a supply of electrical power to both the heating element 142 and the one or more light-emitting devices 188-1, 188-2, simultaneously or according to a control sequence. As described herein, the control circuitry 176 may control the supply of electrical power to the one or more light-emitting devices 188-1, 188-2 to cause the one or more light-emitting devices 188-1, 188-2 to emit light 189-1, 189-2 having one or more particular properties that correspond to one or more particular cartridge properties of the cartridge 110. The control circuitry 176 may cause the one or more light-emitting devices 188-1, 188-2 to emit the light 189-1, 189-2 for one or more particular periods of time ("durations").

In some example embodiments, the control circuitry 176 may control a supply of electrical power to both the heating element 142 and the one or more light-emitting devices 188-1, 188-2, simultaneously or according to a control sequence, in response to a determination that cartridge 110 and power supply assembly 170 are coupled together (e.g., based on a determination that an electrical circuit including power supply 172 and heating element 142 is closed (e.g., "established")) and/or in response to one or more other determinations. For example, the control circuitry 176 may cause the one or more light-emitting devices 188-1, 188-2 to emit light for a particular period of time upon cartridge 110 and power supply assembly 170 being coupled together. In another example, the control circuitry 176 may further cause the one or more light-emitting devices 188-1, 188-2 to emit light for as long as the power supply 172 is determined to be supplying at least a threshold amount of electrical power and/or is determined to be storing at least a threshold amount of electrical power. In response to a determination that the power supply 172 is determined to be supplying less than a threshold amount of electrical power and/or is determined to be storing less than a threshold amount of electrical power, the control circuitry 176 may cause the one or more light-emitting devices 188-1, 188-2 to emit light having a reduced brightness. Restated, the control circuitry 176 may be configured to cause the one or more light-emitting devices 188-1, 188-2 to emit light having a brightness that is at least partially proportional to an amount of electrical power stored at and/or supplied by the power supply 172.

To control the supply of electrical power to a heating element 142 and/or a light source 177 and/or one or more light-emitting devices 188-1, 188-2, the control circuitry 176 may execute one or more instances of computer-executable program code. The control circuitry 176 may include a processor and a memory. The memory may be a computer-readable storage medium storing computer-executable code.

The control circuitry 176 may include processing circuitry including, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. In some example embodiments, the control circuitry 176 may be at least one of an application-specific integrated circuit (ASIC) and/or an ASIC chip.

The control circuitry 176 may be configured as a special purpose machine by executing computer-readable program code stored on a storage device. The program code may include program or computer-readable instructions, software elements, software modules, data files, data structures, and/or the like, capable of being implemented by one or more hardware devices, such as one or more instances of the control circuitry 176 mentioned above. Examples of program code include both machine code produced by a compiler and higher level program code that is executed using an interpreter.

The control circuitry 176 may include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism or capable of transmitting data. Such separate computer readable storage medium may include a USB flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium. The computer programs, program code, instructions, or some combination thereof may be communicated between the control circuitry 176 and a remote computing system via any wireless transmission method, including a near field communication (NFC) link, a wireless network communication link, and/or an ad hoc wireless network communication link. A remote computing system may include a smartphone device. A remote computing system may include a tablet device.

The control circuitry 176 may be a special purpose machine configured to execute the computer-executable code to control the supply of electrical power to the heating element 142, the light source 177, and/or the one or more light-emitting devices 188-1, 188-2.

In some example embodiments, and as shown in FIGS. 1B-1E, the coupling interface 181 may be configured to couple with cartridge 110 to configure the e-vaping device 100 to generate a vapor and may be configured to electrically couple the power supply 172 to the vaporizer assembly 140 of the cartridge 110. The coupling interface 181 of the power supply assembly 170 may include an interface structure 184 and an interface 180. The interface structure 184 includes an outer surface 189 that extends transverse to the longitudinal axis of the power supply assembly 170 and defines an end of cavity 193 and further includes an inner surface 185 that extends coaxially to the longitudinal axis of power supply assembly 170 and at least partially defines side ends of cavity 187. As described further below with reference to FIG. 2, the interface 180 includes a set of electrical contacts configured to couple with corresponding electrical contacts of the interface 149 of the cartridge 110 in order to electrically couple the power supply assembly 170 with the cartridge 110, for example to electrically couple the power supply 172 to at least the vaporizer assembly 140.

The interface structure 184 in some example embodiments is configured to physically align the cartridge 110 in relation to the power supply assembly 170 so that the interface 149 of the cartridge 110 is aligned with the interface 180 of the power supply assembly 170, and thus electrical contacts of the interface 149 are aligned to be connected with electrical contacts of the interface 180 when the cartridge 110 is coupled with the power supply assembly 170.

In some example embodiments, the coupling interface 181 defines one or more cavities 193, 187 into which at least a portion of the cartridge 110 may be inserted to couple the cartridge 110 with the power supply assembly 170, such that interface 149 of cartridge 110 is aligned with and guided to connecting with interface 180. As described above, the interface structure 184 may include one or more surfaces 185, 189 at least partially defining one or more cavities 187, 193 configured to receive at least a portion of the cartridge 110 in order to align interface 180 of the coupling interface 181 with the interface 149 of the coupling interface 196 of cartridge 110 when the cartridge 110 is coupled with the power supply assembly 170. The interface structure 184 may further be configured to hold the cartridge 110 in place in connection with the power supply assembly 170.

Referring to FIG. 1C, the interface structure 184 may include an inner surface 185 at least partially defining a cavity 187 configured to receive a portion of the cartridge 110. As shown in FIGS. 1B-1C, the interface 180 and inner surface 185 may collectively define open-ended cavity 187 configured to receive the protruding vapor generator assembly 130 of the cartridge 110, such that the interface 149 at the proximate end of the vapor generator assembly 130 is inserted into the cavity 187, guided and aligned therein by the inner surface 185 of the interface structure 184, so that the interface 149 is guided towards coupling with interface 180.

In some example embodiments, the coupling interface 196 of the cartridge 110 and the coupling interface 181 of the power supply assembly 170 are each shaped such that the cartridge 110 is configured to be coupled with the power supply assembly 170 in multiple different orientations based on each of the coupling interface 196 of cartridge 110 and coupling interface 181 of power supply assembly 170 having n-fold rotational symmetry, where "n" is an integer having a positive value that is equal to or greater than 1. For example, the coupling interface 196, including interface 149, may have 2-fold rotational symmetry, and the coupling interface 181, including interface 180, may further have 2-fold rotational symmetry, such that the coupling interface 196 may be configured to couple with the coupling interface 181 in two separate orientations that are rotationally offset from each other, around the longitudinal axis of the e-vaping device 100, by 180 degrees. Restated, the cartridge 110 may not be keyed to a single direction of insertion but instead may be configured to be inserted into the power supply assembly 170, such that interface 149 is electrically coupled with interface 180, in multiple, separate directions of insertion. Accordingly, ease of use and/or operational performance of the e-vaping device 100 may be improved, as the probability of incorrectly coupling cartridge 110 and power supply assembly 170 together and potentially damaging cartridge 110 and/or power supply assembly 170 may be reduced.

Still referring to FIG. 1C, the power supply assembly 170 may include an exposed outlet-side inner surface 192 of the housing 101, where the inner surface 192 and outer surface 189 of the interface structure 184 may collectively define an open-ended cavity 193 into which at least a portion of the reservoir 120 of the cartridge 110 may be inserted to align and guide the cartridge 110 into connection with the power supply assembly 170.

In some example embodiments, interface 180 may be flush with, or protruding from, the outer surface 189 of interface structure 184, such that cavity 187 is absent. Similarly, vapor generator assembly 130 may not protrude from the proximate end of the reservoir 120 of the cartridge 110. Thus, the cartridge 110 may be aligned with the power supply assembly 170, such that interface 149 is aligned and guided to coupling with interface 180 based on exposed inner surfaces 192 of the housing 101. In some example embodiments, the outer surface 189 of interface structure 184 may be flush or substantially flush with the end of housing 101, such that at least cavity 193 is omitted.

In some example embodiments, the coupling interface 181 may include one or more magnets 186-1, 186-2 configured to magnetically couple the power supply assembly 170 to the cartridge 110. In some example embodiments, one or more magnets 186-1, 186-2 may be coupled to interface structure 184, and the one or more magnets 186-1, 186-2 may be configured to couple with the cartridge 110 based on magnetic attraction of the cartridge 110 to the one or more magnets 186-1, 186-2. For example, an end portion of the cartridge 110, which may include end portion 115 of reservoir housing 112 may include a material configured to be magnetically attracted to the one or more magnets 186-1, 186-2. For example, in some example embodiments, the end portion 115 of reservoir housing 112 may include one or more magnetic plates, including one or more magnetic steel plates, that are configured to be magnetically attracted to and/or magnetically couple with one or more corresponding magnets 186-1, 186-2. The end portion 115 may include a single magnetic plate, for example, with a hole to accommodate inner tube 122, or multiple magnetic plates, for example separate magnetic steel plates on opposite sides of the vapor generator assembly 130, that may be configured to be magnetically attracted to and/or magnetically couple with separate, respective magnets 186-1 and 186-1 based on the cartridge 110 being inserted into the one or more cavities 193, 187 of the power supply assembly 170. As a result, based on the end portion 115 of reservoir housing 112 being moved into proximity to the outer surface 189 of the interface structure 184, including, for example, the end portion 115 being inserted into the one or more cavities 193, 187 of the power supply assembly 170, the cartridge 110 may be magnetically attracted into engaging with the interface structure 184 based on magnetic attraction between end portion 115 of the reservoir housing 112 to the one or more magnets 186-1, 186-2. The one or more magnets 186-1, 186-2 may then magnetically hold the cartridge 110 in place in relation to the power supply assembly 170, in addition or in alternative to one or more sets of interfaces of the cartridge 110 and power supply assembly 170 engaging with each other when cartridge 110 and power supply assembly 170 are coupled with each other. While an example has been described where end portion 115 includes material configured to be magnetically attracted to a magnet, in some example embodiments other portions of cartridge 110 may also or alternatively include material configured by be magnetically attracted to a magnet. Further, while an example with two magnets has been described, a single magnet or more than two magnets may be used in other example embodiments.

In some example embodiments, one or more magnets 186-1, 186-2 may be included in the cartridge 110 (e.g., housed at least partially within reservoir housing 112), in addition or in alternative to the power supply assembly 170 including one or more magnets 186-1, 186-2 in the coupling interface 181 (e.g., in interface structure 184). In some example embodiments, power supply assembly 170 may include material configured to be magnetically attracted to a magnet.

Referring to FIGS. 1B-1E, in some example embodiments the power supply assembly 170 includes one or more light tube structures 190-1, 190-2 that extend from separate, respective light-emitting devices 188-1, 188-2 (e.g., light-emitting diodes ("LEDs")) and through at least a portion of the coupling interface 181. As shown in FIGS. 1D-1E, light tube structures 190-1 and 190-2 are configured to receive, at the respective proximate ends thereof, light 189-1, 189-2 emitted by the respective proximate light-emitting devices 188-1, 188-2. Each light tube structure 190-1 and 190-2 is configured to channel the received light 189-1, 189-2 from an end of the light tube structure 190-1 and 190-2 to the opposite end of the light tube structure 190-1 and 190-2. As a result, the light tube structures 190-1 and 190-2 are configured to channel the light 189-1, 189-2 that is emitted by the light-emitting devices 188-1, 188-2 to be emitted from the respective ends of the light tube structures 190-1 and 190-2, as shown in at least FIGS. 1D-1E.

As shown in FIGS. 1C-1E, in some example embodiments each light tube structure 190-1 and 190-2 extends through the interface structure 184 of the coupling interface 181 so that ends of the light tube structures 190-1 and 190-2 are exposed from the outer surface 189 of the interface structure 184. In some example embodiments, the ends of the one or more light tube structures 190-1 and 190-2 may be flush ("coplanar") or substantially flush (e.g., flush within manufacturing tolerances and/or material tolerances) with the outer surface 189 of the interface structure 184 of the coupling interface 181.

Still referring to FIGS. 1B-1E, in some example embodiments, the cartridge 110 is configured to include a reservoir housing 112 having at least a portion, for example an end portion 115 of reservoir housing 112, that is transparent to light 189-1, 189-2 and is configured to be exposed to an end of the light tube structures 190-1 and 190-2 when cartridge 110 is coupled to power supply assembly 170. As a result, when cartridge 110 is coupled to power supply assembly 170, the light tube structures 190-1 and 190-2 are configured to emit light 189-1, 189-2, that is channeled from light-emitting devices 188-1, 188-2 (e.g., are configured to channel the light 189-1, 189-2), to one or more portions of the cartridge 110 (e.g., one or more end portions 115 of the reservoir housing 112) and through at least a portion of the reservoir housing 112 and through at least a portion of the cartridge 110 interior, and to the exterior of the cartridge, for example, through a transparent portion 113. Thus, the one or more light tube structures 190-1, 190-2 are configured to emit the channeled light 189-1, 189-2 into an interior of the cartridge 110 that is coupled to the power supply assembly 170. In some example embodiments, only a single light emitting device and a single light tube structure may be used, or more than two light emitting devices and more than two light tube structures may be used. As referred to herein, an element that is described as being "transparent" to light, including visible light, may include an element that is fully transparent to some or all visible light, an element that is partially transparent (e.g., "translucent") to some or all visible light, some combination thereof, or the like.

Referring now to FIG. 1D, in some example embodiments an end portion of the cartridge 110 (e.g., end portion 115 of reservoir housing 112) may be configured to direct light 189-1, 189-2 received from ends of the light tube structures 190-1 and 190-2 through said end portions 115 and into the interior of the reservoir 120 as directed light 191-1 and 191-2. The directed light 191-1 and 191-2 may interact with (e.g., illuminate) one or more portions of the reservoir 120 interior, including pre-vapor formulation held within the interior of the reservoir 120. Based on interacting with the one or more portions of the reservoir 120, the directed light 191-1 and 191-2 may be scattered by the one or more portions to establish scattered light 197-1 and 197-2. As shown in FIG. 1D, the scattered light 197-1 and 197-2 may be directed through one or more particular portions of the cartridge 110, for example the one or more portions 113 of the reservoir housing 112 that are exposed from housing 101 when cartridge 110 is coupled to power supply assembly 170, to be emitted into an external environment and to thereby provide an externally-observable visual illumination of at least a portion of the interior of the reservoir 120, including illumination of pre-vapor formulation held within the reservoir 120. Thus, in some example embodiments, one or more light tube structures 190-1, 190-2 may emit channeled light 189-1, 189-2 into the reservoir 120 of the cartridge, via the reservoir housing 112, to illuminate pre-vapor formulation held in the reservoir 120 to the external environment.

Referring now to FIG. 1E, in some example embodiments an end portion of the cartridge 110 may be configured to direct light 189-1, 189-2 to at least a portion of inner surface 192 via reflection as channeled light 195-1 and 195-2. The channeled light 195-1 and 195-2 may be further directed via reflection to at least the exposed portion 113 of the reservoir housing 112 so that the channeled light 195-1 and 195-2 may be emitted from the exposed portion 113 of the reservoir housing 112 into the external environment as emitted light 199-1 and 199-2 to thereby provide an externally-observable visual illumination of at least a portion of the reservoir housing 112.

In some example embodiments, example embodiments shown in FIGS. 1D and 1E may be combined. In some example embodiments, cartridge 110 is configured to provide both scattered light 197-1 and 197-2 and emitted light 199-1 and 199-2, based on partially directing light 189-1, 189-2 to be directed into reservoir 120 interior to be scattered by pre-vapor formulation held therein that is further directed through the one or more portions 113 of the reservoir housing 112, and further partially directing light 189-1, 189-2 to be channeled via reflections to the exposed portion 113 thereof.

As used herein, the term "flavorant" is used to describe a compound or combination of compounds that may provide flavor and/or aroma to an adult vaper. In some example embodiments, a flavorant is configured to interact with at least one adult vaper sensory receptor. A flavorant may be configured to interact with the sensory receptor via orthonasal stimulation, retronasal stimulation, or both. A flavorant may include one or more volatile flavor substances.

The at least one flavorant may include one or more of a natural flavorant or an artificial ("synthetic") flavorant. The at least one flavorant may include one or more plant extract materials. In some example embodiments, the at least one flavorant is one or more of tobacco flavor, menthol, wintergreen, peppermint, herb flavors, fruit flavors, nut flavors, liquor flavors, any other flavor, or any combinations thereof. In some example embodiments, the flavorant is included in a botanical material. A botanical material may include material of one or more plants. A botanical material may include one or more herbs, spices, fruits, roots, leaves, grasses, or the like. For example, a botanical material may include orange rind material, sweetgrass material or both. In another example, a botanical material may include tobacco material. In some example embodiments, a flavorant that is a tobacco flavor includes a synthetic material, a plant extract material, or both. A plant extract material included in a tobacco flavorant may be an extract from one or more tobacco materials.

In some example embodiments, the housing 101 and the reservoir housing 112 may have a generally oval cross-section. In some example embodiments, the housing 101 and the reservoir housing 112 may have a generally rectangular cross-section. In some example embodiments, the housing 101 and the reservoir housing 112 may have a generally rectangular cross-section with rounded corners. In some example embodiments, the housing 101 and the reservoir housing 112 may have a generally cylindrical cross-section. In some example embodiments, the housings 101 and 112 may have a generally polygonal cross-section. In some example embodiments, the housings 101 and 112 may have a generally triangular cross-section. Any other type of cross-section shapes may be used, and one or both housings may have different cross-section shapes along the housing. Furthermore, the housings 101 and 112 may have the same or different cross-section shape, or the same or different size.

In some example embodiments, the housing 101 and the reservoir housing 112 may be a single tube housing both the cartridge 110 and the power supply assembly 170, and the entire e-vaping device 100 may be disposable.

Pre-vapor formulation, as described herein, is a material or combination of materials that may be transformed into a vapor. Any type of pre-vapor formulation may be used. For example, the pre-vapor formulation may be a liquid, solid and/or gel formulation including, but not limited to, water, beads, solvents, active ingredients, ethanol, plant extracts, natural or artificial flavors, and/or vapor formers such as glycerin, glycerol, propylene glycol, some combination thereof, or the like. In further example embodiments, the pre-vapor formulation may include those described in U.S. Patent Application Publication No. 2015/0020823 to Lipowicz et al. filed Jul. 16, 2014 and U.S. Patent Application Publication No. 2015/0313275 to Anderson et al. filed Jan. 21, 2015, the entire contents of each of which is incorporated herein by reference thereto.

The pre-vapor formulation may include nicotine or may exclude nicotine. The pre-vapor formulation may include one or more tobacco flavors, or any other flavors. The pre-vapor formulation may include one or more flavors that are separate from one or more tobacco flavors.

In some example embodiments, a pre-vapor formulation that includes nicotine may also include one or more acids. The one or more acids may be one or more of pyruvic acid, formic acid, oxalic acid, glycolic acid, acetic acid, isovaleric acid, valeric acid, propionic acid, octanoic acid, lactic acid, levulinic acid, sorbic acid, malic acid, tartaric acid, succinic acid, citric acid, benzoic acid, oleic acid, aconitic acid, butyric acid, cinnamic acid, decanoic acid, 3,7-dimethyl-6-octenoic acid, 1-glutamic acid, heptanoic acid, hexanoic acid, 3-hexenoic acid, trans-2-hexenoic acid, isobutyric acid, lauric acid, 2-methylbutyric acid, 2-methylvaleric acid, myristic acid, nonanoic acid, palmitic acid, 4-penenoic acid, phenylacetic acid, 3-phenylpropionic acid, hydrochloric acid, phosphoric acid, sulfuric acid or any combinations thereof.

The reservoir 120, in some example embodiments, may include a storage medium that may hold the pre-vapor formulation. The storage medium may be a fibrous material including at least one of cotton, polyethylene, polyester, rayon or any combinations thereof. The fibers may have a diameter ranging in size from about 6 microns to about 15 microns (e.g., about 8 microns to about 12 microns or about 9 microns to about 11 microns), but other ranges may be used. The storage medium may be a sintered, porous or foamed material. Also, the fibers may be sized to be irrespirable and may have a cross-section that has a Y-shape, cross shape, clover shape or any other suitable shape. If and/or when the reservoir 120 includes a storage medium, the propagation of light through the reservoir 120 may be at least partially inhibited. In some example embodiments, the reservoir 120 may include a tank lacking any storage medium and containing only pre-vapor formulation. As has been described, at least a portion of light may be directed through pre-vapor formulation held in the reservoir 120, and out into the external environment via the reservoir housing 112 (e.g., based on scattering of the light by the pre-vapor formulation in the reservoir 120), such that the pre-vapor formulation held in the reservoir 120 is illuminated to external observation.

In some example embodiments, the reservoir 120 may be sized and configured to hold enough pre-vapor formulation such that the e-vaping device 100 may be configured for vaping for at least about 1000 seconds. The e-vaping device 100 may be configured to allow each vaping to last a maximum of about 10 seconds. Other configurations for longer or shorter durations may be used.

The dispensing interface 144 in some example embodiments may include a wick. The dispensing interface 144 may include filaments (or threads) having a capacity to draw the pre-vapor formulation. For example, a dispensing interface 144 may be a wick that is a bundle of glass (or ceramic) filaments, a bundle including a group of windings of glass filaments, etc., all of which arrangements may be capable of drawing pre-vapor formulation via capillary action by interstitial spacings between the filaments. The filaments may be generally aligned in a direction perpendicular (transverse) to the longitudinal axis of the e-vaping device 100. Any other wicking materials or arrangements may be used. As shown in FIGS. 1B-1C, 1H, and 2, the wick may include a rectangular or substantially rectangular sheet of wicking material.

In some example embodiments the dispensing interface 144 may include any suitable material or combination of materials, also referred to herein as wicking materials. Examples of suitable materials may be, but not limited to, glass, ceramic- or graphite-based materials. The dispensing interface 144 may have any suitable capillary drawing action to accommodate pre-vapor formulations having different physical properties such as density, viscosity, surface tension and vapor pressure.

In some example embodiments, the heating element 142 may include a wire element. The wire element may be a metal wire. In some example embodiments, the wire element may be isolated from direct contact with the dispensing interface 144. In some example embodiments, the heating element 142 may be in direct contact with the dispensing interface 144. In some example embodiments, the heating element 142 may include a metal heating element, a non-metallic heating element, and/or a bayonet heating element. In some example embodiments, the heating element 142 may be on (e.g., may at least partially cover) one side of the dispensing interface 144. In some example embodiments, the heating element 142 may be on (e.g., may at least partially cover) each side of opposite sides of the dispensing interface 144. In some example embodiments, the heating element 142 may at least partially extend around (e.g., may at least partially wrap around) the dispensing interface.

In some example embodiments, the heating element 142 includes a stamped structure, a cut structure, an etched structure, some combination thereof, or the like. A cut structure may be a laser-cut structure, a chemical-cut structure, a mechanically-cut structure, some combination thereof, or the like. An etched structure may be a chemical-etched structure, a laser-etched structure, a mechanically-etched structure, some combination thereof, or the like.

The heating element 142 of some example embodiment may at least partially comprise any suitable electrically resistive materials. Examples of suitable electrically resistive materials may include, but not limited to, titanium, zirconium, tantalum, metals from the platinum group, etc. Examples of suitable metal alloys include, but not limited to, stainless steel, nickel, cobalt, chromium, aluminum-titanium-zirconium, hafnium, niobium, molybdenum, tantalum, tungsten, tin, gallium, manganese and iron-containing alloys, super-alloys based on nickel, iron, cobalt, stainless steel, etc. For example, the heating element 142 may be formed of nickel aluminide, a material with a layer of alumina on the surface, iron aluminide and/or other composite materials, the electrically resistive material may optionally be embedded in, encapsulated or coated with an insulating material or vice-versa, depending on the kinetics of energy transfer and the external physicochemical properties required. The heating element 142 may include at least one material selected from the group consisting of stainless steel, copper, copper alloys, nickel-chromium alloys, super alloys and combinations thereof. In some example embodiments, the heating element 142 may be formed of nickel-chromium alloys or iron-chromium alloys. In some example embodiments, the heating element 142 may be a ceramic heater having an electrically resistive layer on an outside surface thereof.

In some example embodiments, the heating element 142 may heat a pre-vapor formulation in the dispensing interface 144 to form a generated vapor by thermal conduction. In some example embodiments, heat from the heating element 142 may be conducted to the pre-vapor formulation by means of a heat conductive element or the heating element 142 may transfer heat to the incoming ambient air that is drawn through the e-vaping device 100 during vaping, which in turn heats the pre-vapor formulation by convection.

It should be appreciated that, in some example embodiments, instead of using a dispensing interface 144, the vaporizer assembly 140 may include a heating element 142 that is a porous material which incorporates a resistance heater formed of a material having a high electrical resistance capable of generating heat quickly.

Figure 2:
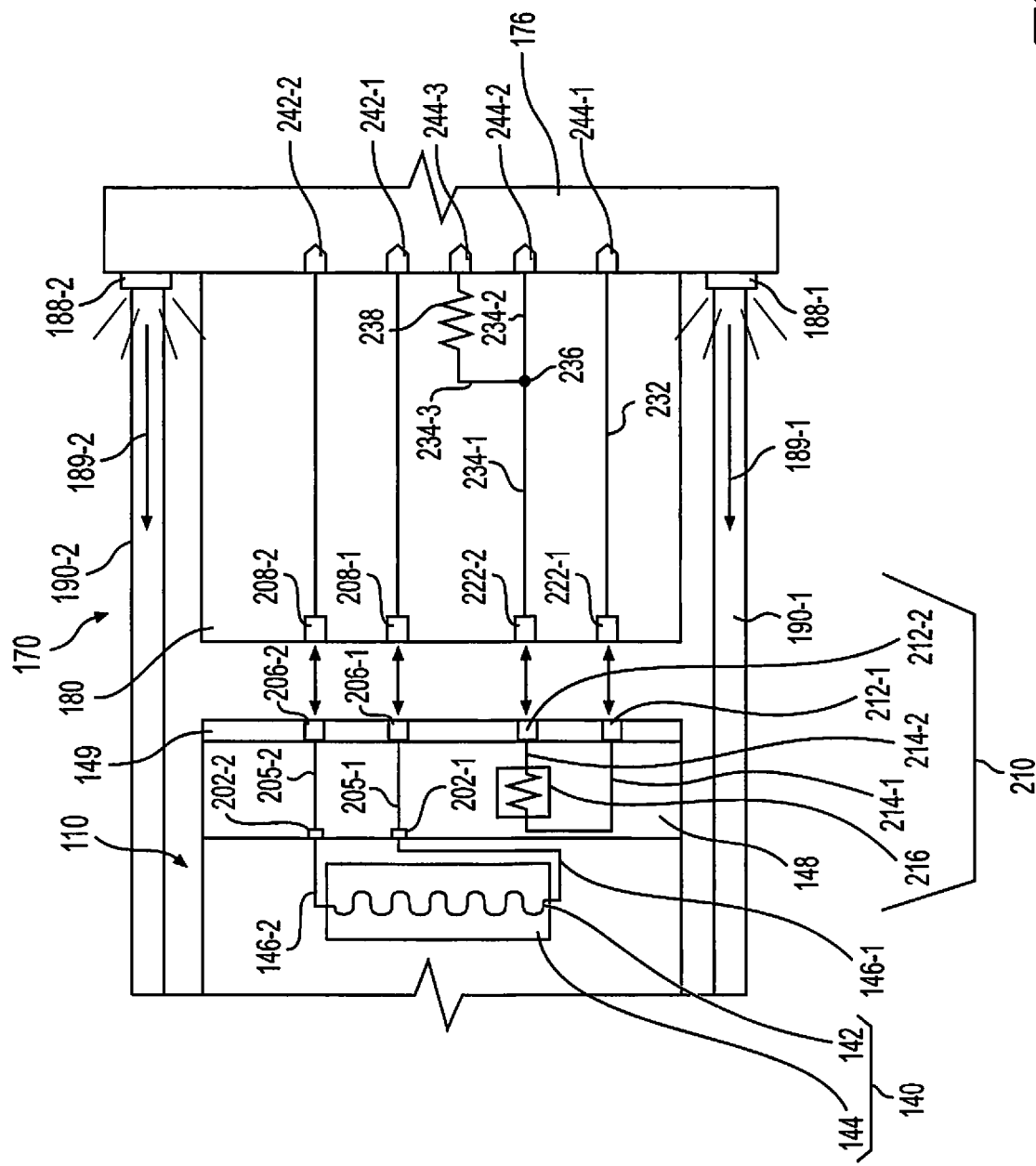
FIG. 2 is a schematic view of an e-vaping device, according to some example embodiments.

FIG. 2 is a schematic view of a portion of an e-vaping device, according to some example embodiments. As shown in FIG. 2, and as further described above with reference to FIGS. 1A-1E, in some example embodiments cartridge 110 includes a vapor generator assembly 130 including an interface 149, circuit 148, and vaporizer assembly 140, and electrical pathways 146-1 and 146-2. As further shown, in some example embodiments power supply assembly 170 includes control circuitry 176, light-emitting devices 188-1, 188-2, light tube structures 190-1 and 190-2, and a coupling interface 181 including interface structure 184 and interface 180.

In some example embodiments, vaporizer assembly 140 includes a heating element 142 and dispensing interface 144, wherein the heating element 142 is further coupled at opposite ends to electrical pathways 146-1 and 146-2. Interface 149 includes in some example embodiments electrical contacts 206-1 to 206-2 which are each configured to couple with a corresponding electrical contact (described further below) of the interface 180 of the power supply assembly 170 to electrically couple the heating element 142 to the power supply assembly 170. In the particular example embodiments shown in FIG. 2, circuit 148 includes contacts 202-1 and 202-2 which are coupled with electrical pathways 146-1 and 146-2, respectively. Contacts 202-1 and 202-2 are electrically coupled with contacts 206-1 and 206-2, respectively, via respective electrical pathways 205-1 to 205-2. It will be understood that, in some example embodiments, at least some of the aforementioned elements may be omitted. For example, contacts 202-1 and 202-2 and pathways 205-1 and 205-2 may be omitted, such that electrical pathways 146-1 and 146-2 are directly connected to respective contacts 206-1 and 206-2.

Further, in some example embodiments, interface 180 includes electrical contacts 208-1 and 208-2 which are configured to couple with electrical contacts 206-1 and 206-2, respectively, when interfaces 149 and 180 are coupled together. As further shown in FIG. 2, electrical contacts 208-1 and 208-2 are configured to be coupled to contacts 242-1 and 242-2 of the control circuitry 176 via respective electrical pathways. Contact 242-1 may be configured, inherently or in accordance with selective control by control circuitry 176, to supply electrical power from the power supply 172. Contact 242-2 may be connected to an electrical ground (e.g., contact 242-2 may be grounded).

Thus, control circuitry 176 may be configured to supply electrical power to heating element 142, when cartridge 110 is coupled to power supply assembly 170, based on enabling and/or selectively enabling the supply of electrical power (e.g., voltage) from the power supply 172 to electrical contact 242-1, thereby establishing an electrical circuit extending from the power supply 172, through contacts 208-1 and 206-1 to heating element 142, and back to the grounded electrical contact 242-2 via contacts 206-2 and 208-2. Control circuitry 176 may selectively enable or inhibit the supply of electrical power to the vaporizer assembly 140 to selectively enable or inhibit vapor generation by e-vaping device 100, based on selectively enabling or inhibiting the supply of electrical power from power supply 172 to electrical contact 242-1. It will be understood that, in some example embodiments, at least some of the aforementioned elements may be omitted. For example, contacts 208-1 and 208-2 and shown pathways may be omitted, such that contacts 206-1 and 206-2 are directly connected to respective contacts 242-1 and 242-2.

Further, in some example embodiments, circuit 148 may include a cartridge identity circuit 210 that includes a resistor 216, electrical contacts 212-1 and 212-2, and electrical pathways 214-1 and 214-2 connecting opposite ends of the resistor 216 to separate, respective electrical contacts 212-1 and 212-2. In some example embodiments, the resistor 216 may be replaced and/or supplemented by one or more various additional and/or alternative elements, including one or more additional resistors. In some example embodiments, the resistor 216 has a particular resistance value ("resistance").

In some example embodiments, different "types" of cartridges 110 (e.g., cartridges 110 having different properties, including different pre-vapor formulations having different flavorants or ingredients) may have different identity circuits 210, including different resistors 216 having different, particular resistance values.

In some example embodiments, a particular cartridge 110 may include an identity circuit 210 that stores information, also referred to herein as a particular instance of information associated with the particular cartridge 110, where the particular instance of information indicates (e.g., is associated with, includes, etc.) at least one particular value. The identity circuit 210, and thus the cartridge 110, may be configured to communicate at least a portion (e.g., a value) of the particular instance of information to the power supply assembly 170, and the power supply assembly 170 may be configured to process (e.g., "determine") at least a value of the particular instance of information.

As referred to herein, a value of an instance of information may be a particular alphanumeric value, a particular code, some combination thereof, or the like, or any other information.

In some example embodiments, a given cartridge 110 may include an identity circuit 210 that includes a storage device that stores information having at least a value that is uniquely associated with a particular "type" of cartridge with which the given cartridge 110 is associated, a particular "type" of pre-vapor formulation in the cartridge 110, information related to an amount of pre-vapor formulation in the cartridge 110, information related to how much the cartridge has been used, or any other type of information associated with the cartridge 110, or combinations thereof. The storage device may be, for example, an electrically erasable programmable read-only memory (EEPROM), but it will be understood that various known storage devices may be included in the identity circuit 210. The identity circuit 210 may include a storage device in addition to or in alternative to a resistor 216. Accordingly, while FIG. 2 may illustrate an identity circuit 210 that includes a resistor 216, it will be understood that in some example embodiments the identity circuit 210 may not include resistor 216 and may include a storage device configured to store at least a particular instance of information (e.g., a value thereof) that is associated with the cartridge 110 in which the identity circuit 210 is included.

In some example embodiments, a value of a particular instance of information associated with a cartridge 110 may include a particular resistance value associated with the cartridge 110 (e.g., a particular resistance value of a resistor 216 of the identity circuit 210 of the cartridge 110) and thus is not associated with other types of cartridges 110. In some example embodiments, a particular instance of information associated with a cartridge 110 may include a particular value, stored in a storage device of the identity circuit 210, that is particularly associated with a particular type of cartridge 110 and thus is not associated with other types of cartridges 110.

Referring back to power supply assembly 170, in some example embodiments interface 180 includes electrical contacts 222-1 and 222-2 that are configured to couple with electrical contacts 212-1 and 212-2 of the cartridge 110 when the power supply assembly 170 is coupled to the cartridge 110. The control circuitry 176 further includes electrical contact 244-1 that is electrically coupled to electrical contact 222-1 via electrical pathway 232, and the control circuitry 176 is configured to selectively supply electrical power from power supply 172 to electrical contact 244-1, such that electrical power may be supplied from power supply 172 to the cartridge identity circuit 210 via electrical contact 244-1, pathway 232, contact 222-1, and contact 212-1. It will be understood that, in some example embodiments, at least some of the aforementioned elements may be omitted. For example, contacts 222-1 and 222-2 and one or more pathways may be omitted.

Some example embodiments may include a voltage divider circuit that includes electrical contact 222-2 in the interface 180, electrical contacts 244-2 and 244-3 in the control circuitry 176, electrical pathways 234-1 to 234-3, resistor 238, and the identity circuit 210. As shown in FIG. 2, electrical contact 244-2 is electrically coupled to electrical contact 222-2 via pathway 234-1 and 234-2. Electrical contact 244-2 may furthermore be grounded, electrically coupled to an electrical ground, or the like. In addition, resistor 238 is coupled in series with pathways 234-3 and 234-1 between branch node 236 and electrical contact 244-3. Thus, electrical contacts 244-2 and 244-3 are electrically coupled to the electrical contact 222-2 in parallel via node 236 and pathway 234-1.

In some example embodiments, the control circuitry 176 may be configured to apply a voltage to contact 244-1 and thus to the identity circuit 210 of a coupled cartridge 110 via coupled contacts 212-1 and 222-1. The control circuitry 176 may control the power supply 172 to apply an "input voltage" ($V_{in}$) to contact 244-1. The control circuitry 176 may further be configured to determine a voltage of electrical power received at contact 244-3 from the identity circuit 210 via coupled contacts 212-2 and 222-2. The control circuitry 176 may measure an "output voltage" ($V_{out}$) at contact 244-3.

It will be understood that in some example embodiments the identity circuit 210, pathways 234-1 to 234-3 and 232, resistor 238, node 236, and contacts 222-1 to 222-2 and 244-1 to 244-3 may collectively comprise a voltage divider circuit based on the power supply assembly 170 being coupled to the cartridge 110. Accordingly, the electrical resistance ("resistance value") of resistor 238 may be known to control circuitry 176, for example, based on the resistance value of the resistor 238 being stored in a database accessible to the control circuitry 176.

In some example embodiments, one or more of resistors 216, 238 may be supplemented and/or replaced by one or more elements, including one or more impedances (e.g., one or more resistors and/or capacitors).

In some example embodiments, at least resistor 238 may be absent. Control circuitry 176 may be configured to be communicatively coupled with identity circuit 210, via one or more instances of circuitry, based on cartridge 110 coupling with the power supply assembly 170, such that the control circuitry 176 may be configured to access a storage device included in the identity circuit 210 in response to determining that the power supply assembly 170 is coupled to a cartridge 110 (e.g., in response to determining that an electrical circuit extending through the power supply assembly 170 and the cartridge 110 is closed as a result of the power supply assembly 170 being coupled with the cartridge 110). The control circuitry 176 may be configured to process one or more instances of information accessed from the identity circuit 210 in order to identify ("determine") one or more values of one or more particular instances of information associated with the cartridge 110. In some example embodiments, a particular resistance value of resistor 216 of identity circuit 210 may be referred to as a value of a particular instance of information associated with the cartridge 110 in which the identity circuit 210 is included, and thus it will be understood that operations performed by control circuitry 176 based on the determined resistance value of resistor 216, as described herein, may be similarly performed with regard to any determined value of any particular instance of information accessed from identity circuit 210.

With particular reference to example embodiments in which the identity circuit 210 includes a resistor 216 and a value of a particular instance of information associated with cartridge 110 is a particular resistance value of the resistor 216, in some example embodiments, the control circuitry 176 may be configured to determine the resistance value of resistor 216 based on causing electrical power to be supplied to identity circuit 210 via contact 244-1, applying $V_{in}$ at contact 244-1, measuring $V_{out}$ at contact 244-3, and determining the resistance value of resistor 216 via applying known and/or measured values to one or more well-known voltage divider equations. For example, in the example embodiments shown in FIG. 2, where the resistance value of resistor 238 that is known to control circuitry 176 is referred to herein as $R_2$, the resistance value of resistor 216 may be calculated ("determined") as $R_1$ by control circuitry 176 via the following equation (1), where the resistances of the electrical contacts 222-1 and 222-2, electrical contacts 212-1 and 212-2, electrical contacts 244-1 to 244-3, and pathways 214-1 to 214-2, 232, and 234-1 to 234-4 are assumed to be negligible:

$$R_1 = R_2\left(\frac{V_{in}}{V_{out}} - 1\right) \quad (1)$$

It will be understood that the resistance value ($R_1$) of resistor 216 may be calculated, wherein the resistances of the electrical contacts 222-1 and 222-2, electrical contacts 212-1 and 212-2, electrical contacts 244-1 to 244-3, and pathways 214-1 to 214-2, 232, and 234-1 to 234-4 are known or estimated by control circuitry 176, according to well-known methods of calculating an unknown resistance value in a voltage divider (e.g., resistive divider).

Where the resistances of the electrical contacts 222-1 and 222-2, electrical contacts 212-1 and 212-2, electrical contacts 244-1 to 244-3, and pathways 214-1 to 214-2, 232, and 234-1 to 234-3 are assumed to be collectively not negligible, the resistance value that is calculated ("determined") as $R_1$ by control circuitry 176 in equation 1 may still be a particular resistance value that is particularly associated with the particular cartridge 110 coupled to power supply assembly 170. Restated, the resistance value that is calculated ("determined") as $R_1$ by control circuitry 176 in equation 1 may be a sum of all resistances of the circuit between contacts 244-1 and 244-2 (e.g., excluding the resistances of pathway 234-3 and resistor 238), including all resistances of the circuit in cartridge 110.

As referred to herein, the resistance value ($R_1$) of resistor 216 may be referred to as a "determined resistance value" of cartridge 110. As referred to herein, a value of a particular instance of data accessed from identity circuit 210 by the control circuitry 176 may be referred to as a determined value of a particular instance of information of cartridge 110. As described herein, the determined value of the particular instance of information of cartridge 110 may include information indicating a particular value (e.g., a particular alphanumeric value, a particular code, some combination thereof, or the like, or any other information). The determined value of the particular instance of information may be the determined resistance value, such that the value of the particular instance of information may be a particular resistance value.

In some example embodiments, the control circuitry 176, based on determining the determined value of the particular instance of information of cartridge 110, including for example the determined resistance value of cartridge 110, may access an accessible database (e.g., "index"), which may be stored in a memory that may be included in power supply assembly 170 and communicatively coupled with and/or included in control circuitry 176, to determine whether the determined value of the particular instance of information (e.g., determined resistance value) 1) includes a value that is within a particular range of stored values (e.g., a particular range of resistance values) that are associated with a determination that the power supply assembly 170 is coupled with an authenticated cartridge 110, and/or 2) matches or substantially matches a value of a stored instance of information (e.g., a stored resistance value) included in an entry of a set of entries in an accessible database. As referred to herein, a value of an instance of information (e.g., a resistance value) that is determined to "substantially match" a value of another instance of information (e.g., another resistance value) may be a value (e.g., resistance value) within a particular margin of the value (e.g., resistance value) of the other instance of information. For example, a determined resistance value that is within a margin range of 10% regarding the other resistance value (e.g., inclusively between 90% to 110% of the stored value) may be determined to substantially match the other resistance value. As further referred to herein, a value and/or instance of information that "matches or substantially matches" another value and/or instance of information may be referred to as "corresponding to" the other value and/or instance of information.

In some example embodiments, the control circuitry 176, based on identifying a stored instance of information (e.g., resistance) in the database having a value to which the determined value of the particular instance of information (e.g., resistance value) corresponds, may process the particular entry of the database in which the identified instance of information (e.g., resistance) is included to identify one or more particular cartridge property values ("cartridge properties") that are included in the particular entry. Such one or more particular cartridge properties included in an entry may be understood herein to be "associated" with the identified instance of information (e.g., resistance) also included in the entry based on being included in a common database entry.

As the one or more particular cartridge properties (also referred to herein as a "particular set of cartridge properties") are identified based on the determined instance of information (e.g., resistance value, also referred to herein as a particular electrical resistance associated with the cartridge 110 that is coupled to the power supply assembly 170), the identified particular cartridge properties may be understood to be associated with the cartridge 110. Thus, because the one or more particular cartridge properties associated with the cartridge 110 are identified based on determining that the determined instance of information (e.g., resistance value) corresponds to a particular stored instance of information (e.g., resistance value) that is itself associated with the one or more particular cartridge properties, the control circuitry 176 will be understood to identify a particular set of cartridge properties associated with the cartridge 110 coupled to the power supply assembly 170 based on determining a particular instance of information (e.g., electrical resistance (e.g., $R_1$)) that is associated with the cartridge 110.

In some example embodiments, based on identifying a particular set of one or more cartridge properties associated with the identified instance of information having a value corresponding to the value of the determined instance of information (e.g., based on identifying a particular set of cartridge properties associated with the cartridge 110 coupled to the power supply assembly 170), the control circuitry 176 may control the supply of electrical power to the one or more light-emitting devices 188-1, 188-2 to cause the one or more light-emitting devices 188-1, 188-2 to emit light 189-1, 189-2 having a particular ("selected") set of one or more light properties (e.g., color, brightness, pattern, duration, etc.) (in some example embodiments, electrical power may also or alternatively be supplied to light source 177 to cause the light source 177 to emit light having a particular set of one or more light properties). For example, the particular set of cartridge properties that is identified to be associated with the cartridge 110 may include a particular set of light properties. Each separate set of cartridge properties in an accessible database (which may be associated with separate, respective stored values of instances of information) may include and/or be associated with separate, respective sets of light properties. Based on identifying a particular set of cartridge properties associated with a cartridge 110, the control circuitry 176 may thus identify a particular set of light properties, of a plurality of sets of light properties, that is associated with the cartridge 110.

The control circuitry 176 may control one or more particular light properties of the light 189-1, 189-2 emitted by the one or more light-emitting devices 188-1, 188-2 in accordance with the particular set of light properties included in and/or associated with the identified particular set of cartridge properties associated with the cartridge 110, such that the emitted light 189-1, 189-2 communicates information based on the one or more particular properties of the emitted light 189-1, 189-2. Because the particular light properties of the emitted light 189-1, 189-2 are included in and/or associated with the cartridge 110, the emitted light may thus communicate information associated with the particular cartridge 110 in accordance with the particular light properties.

Thus, in some example embodiments, based on being configured to cause the one or more light-emitting devices 188-1, 188-2 to emit light 189-1, 189-2 (as noted earlier, 177 may also or alternatively be used) that has one or more particular light properties associated with (corresponding to) the particular cartridge 110 coupled to the power supply assembly 170, the control circuitry 176 may cause the e-vaping device 100 to communicate, to an adult vaper observing at least a portion of the e-vaping device 100 (e.g., a portion 113 of reservoir housing 112 exposed by housing 101), information indicating one or more properties of the cartridge 110 coupled to the power supply assembly 170, including a particular "type" of cartridge 110. As referred to herein, an indication of a particular cartridge "type" of a particular cartridge 110 may refer to an indication that the cartridge 110 is associated with one or more particular cartridge properties, including, for example, an identity of one or more flavorants held in the reservoir 120 of the cartridge 110.

In some example embodiments, the one or more particular light properties may include a color temperature of the emitted light and/or a brightness of the emitted light 189-1, 189-2 and/or a length of time ("period of elapsed time") that the light 189-1, 189-2 is emitted by the one or more light-emitting devices 188-1, 188-2.

It will be understood that the light emitted from e-vaping device 100, for example as light 197-1, 197-2, 199-1 and/or 199-2, as shown in FIG. 1D and/or FIG. 1E, may have common or substantially common (e.g., common within manufacturing tolerances and/or material tolerances) properties (e.g., color, brightness, duration, and/or pattern) as light 189-1, 189-2.

In some example embodiments, control circuitry 176 may be configured to identify a particular set of cartridge properties associated with the cartridge 110, based on determining a value of a particular instance of information associated with the cartridge, and control one or more light-emitting devices 188-1, 188-2 to emit light 189-1, 189-2 having a particular set of light properties associated with the identified particular set of cartridge properties. The identifying the particular set of cartridge properties may include determining that the value of the particular determined instance of information associated with the cartridge 110 corresponds with a value of a particular stored instance of information of a plurality of stored instances of information in a database, the particular stored instance of information associated with a stored set of light properties, and the controlling the one or more light-emitting devices 188-1, 188-2 may include identifying the stored set of light properties associated with the particular stored instance of information as the particular set of light properties associated with the identified particular set of cartridge properties.

In some example embodiments, different types of cartridges 110 may be associated with different cartridge properties, for example pre-vapor formulations having different respective properties (e.g., different flavorants and/or ingredients). Different types of cartridges 110 may be distinguishable by having identity circuits 210 including storage devices storing different instances of information and/or including resistors 216 having different respective resistances. For example, a cartridge 110 having, in reservoir 120, a pre-vapor formulation having a first flavorant may have a resistor 216 having a first resistance and/or a storage device storing a first instance of information having a first value; and a cartridge 110 having, in reservoir 120, a pre-vapor formulation having a different, second flavorant may have a resistor 216 having a second, different resistance and/or a storage device storing a second instance of information having a second, different value. In some example embodiments where the determined instance of information includes a determined resistance value of a cartridge 110, the determined resistance value may be determined based on utilizing a voltage divider circuit, and may thus be based on the resistance value of the resistor in the cartridge 110. Based on identifying and/or receiving the value of the particular instance of information of a cartridge 110 coupled to the power supply assembly 170, a control circuitry 176 may be configured to provide a particular indication (via light having one or more particular sets of light properties that is emitted as light 189-1, 189-2 by the one or more light-emitting device 188-1, 188-2) of one or more particular properties of the particular cartridge 110 to which the power supply assembly 170 is coupled. As a result, in some example embodiments an e-vaping device 100 is configured to provide an adult vaper with a visually observable illumination that further provides one or more instances of visually-observable information associated with the e-vaping device 100, for example indicating one or more particular properties associated with the cartridge 110, pre-vapor formulation held therein, amount of power stored in the power supply 172, some combination thereof, or the like, based on one or more particular light properties of the emitted light comprising the illumination. In some example embodiments, light properties of light emitted by one or more light-emitting devices 188-1, 188-2 and/or light emitted from the e-vaping device 100 may include, for example and without limitation, color, brightness, duration, pattern of the light, etc., and/or combinations thereof.

In some example embodiments, a cartridge 110 may include an identity circuit 210 that includes a storage device storing information indicating a particular set of light properties associated with the cartridge 110. In some example embodiments, control circuitry 176 may be configured to identify the particular set of light properties indicated by the information stored in the storage device of the identity circuit 210, for example based on identity circuit 210 being electrically coupled to control circuitry 176. The control circuitry 176 may be further configured to, in response to identifying the particular set of light properties indicated by the information stored in the storage device of the identity circuit 210, control one or more light-emitting devices 188-1, 188-2 to emit light 189-1, 189-2 having the identified particular set of light properties. In some example embodiments, based on the control circuitry 176 being configured to control the one or more light-emitting devices 188, 188-2 to emit light 189-1, 189-2 having a particular set of light properties, based on identifying the particular set of light properties based on processing information stored at a storage device included in the identity circuit 210 of cartridge 110, the control circuitry 176 may be configured to control the one or more light-emitting devices 188-1, 188-2 to emit light 189-1, 189-2 having a particular set of light properties without accessing any databases and/or look-up tables.

In some example embodiments, a cartridge 110 may include an identity circuit 210 that includes a storage device storing information indicating a particular set of electrical power properties associated with the cartridge 110, where the particular set of electrical power properties are associated with electrical power that, when supplied to a light-emitting device, causes the light-emitting device to emit light having a particular set of light properties. In some example embodiments, control circuitry 176 may be configured to identify the particular set of electrical power properties indicated by the information stored in the storage device of the identity circuit 210, for example based on identity circuit 210 being electrically coupled to control circuitry 176. The control circuitry 176 may be further configured to, in response to identifying the particular set of electrical power properties indicated by the information stored in the storage device of the identity circuit 210, supply electrical power having the particular set of electrical power properties to the one or more light-emitting devices to cause the one or more light-emitting devices 188-1, 188-2 to emit light 189-1, 189-2 having the associated particular set of light properties. In some example embodiments, based on the control circuitry 176 being configured to supply electrical power having the particular set of electrical power properties to the one or more light-emitting devices 188-1, 188-2, based on identifying the particular set of electrical power properties based on processing information stored at a storage device included in the identity circuit 210 of cartridge 110, the control circuitry 176 may be configured to control the one or more light-emitting devices 188-1, 188-2 to emit light 189-1, 189-2 having a particular set of light properties without accessing any databases and/or look-up tables.

Additionally, in some example embodiments, the control circuitry 176 may be configured to cause light-emitting devices 188-1, 188-2 to emit light 189-1, 189-2 having one or more particular light properties (e.g., a particular and/or selected set of light properties) based on the value received from cartridge 110 and/or based on identifying that the value of the determined instance of information of the cartridge 110 corresponds to a value of an instance of information included in a particular entry in a set of entries in an accessible database and further selectively enabling the supply of electrical power from power supply 172 to the vaporizer assembly 140, such that the e-vaping device 100 is selectively enabled to supply electrical power to vaporizer assembly 140 based on sensor data received from sensor 174 and processed at control circuitry 176. Thus, by causing light 189-1, 189-2 having particular properties to be emitted from light-emitting devices 188-1, 188-2, and thus causing light having the same or substantially the same properties to be emitted from the cartridge 110 into the external environment, the e-vaping device 100 provides an externally-observable visual indication that the cartridge 110 is confirmed by power supply assembly 170 to be authenticated and vapor generation by e-vaping device 100 has been selectively enabled. Thus, the adult vaper's interaction with the e-vaping device 100 is improved based on the adult vaper being provided with useful information indicating an operating state of the e-vaping device, for example whether vapor generation is selectively enabled, and/or one or more cartridge properties of the coupled cartridge 110 (e.g., flavor, etc.).

In some example embodiments, an accessible database includes entries including particular instances of information and associated cartridge properties and/or light properties may be a look-up table. The look-up table may include a set of entries associated with separate, respective instances of information and values thereof (e.g., resistance values in some example embodiments). Each entry in the set of entries may further be associated with a particular type of cartridge 110 and may further be associated with particular information, including one or more particular cartridge properties, one or more particular light properties, etc., associated with the particular type of cartridge 110. For example, each entry may include one or more cartridge properties including one or more particular light properties of light to be emitted by one or more light-emitting devices 188-1, 188-2 to provide a visible indication of the "type" of cartridge 110 coupled to the power supply assembly 170, one or more properties of electrical power to be supplied to the one or more light-emitting devices 188-1, 188-2 to cause the one or more light-emitting devices 188-1, 188-2 to emit light 189-1, 189-2 having the one or more particular light properties, some combination thereof, or the like.

In some example embodiments, a look-up table may be stored in a memory. The memory may be included in the control circuitry 176, may be separate from the control circuitry 176, within or external to the e-vaping device 100, but communicatively coupled to the control circuitry 176 such that the control circuitry 176 may access the information included in the memory.

In some example embodiments, a set of entries in a look-up table include one or more particular cartridge properties associated with particular instances of information and values thereof (e.g., resistance values) may be generated according to well-known empirical techniques. For example, a database of entries associated with separate types of cartridges 110, where each entry includes one or more cartridge properties associated with a particular, separate cartridge type may be initially generated, and values of particular instances of information (e.g., resistance values) may be added to respective entries of the look-up table based on, for each particular cartridge type, coupling a cartridge 110 of the particular cartridge type to power supply assembly 170, determining a value of an instance of information accessed from the cartridge 110 (e.g., measuring the resistance $R_2$ of resistor 238 via any well-known technique for determining a resistance value of a resistor, applying $V_{in}$ at contact 244-1, measuring $V_{out}$ at contact 244-3, and determining the resistance value $R_1$ of resistor 216 via one or more well-known voltage divider calculations, for example via Equation (1) as presented above). The resistance value $R_1$ of resistor 216, empirically measured when a particular known type of cartridge 110 is coupled to power supply assembly 170, may be added to a particular entry of the look-up table that is particularly associated with the particular known type of cartridge 110 (e.g., includes information particularly associated with the particular known type of cartridge 110). Such a process may be repeated for each different type of cartridge as included in the look-up table, so that each entry in a set of entries in the look-up table includes a particular empirically-determined value of an instance of information (e.g., resistance value) associated with a particular type of cartridge 110 (and thus one or more particular cartridge properties associated with the particular type of cartridge 110).

In some example embodiments, a look-up table includes a set of entries that each include a separate particular resistance value, and each different type of cartridge 110 includes an identity circuit 210 with a particular resistor 216 having a particular resistance value, and each resistance value in each entry of a set of entries in the look-up table may be established based on empirically measuring the resistance value of resistor 216 in each different type of cartridge 110 and adding that resistance value into the look-up table entry associated with that particular type of cartridge 110.

In some example embodiments, the control circuitry 176 may selectively enable the supply of electrical power from power supply 172 to the vaporizer assembly 140 of the coupled cartridge 110 based on determining that the determined instance of information associated with the coupled cartridge 110 corresponds to an instance of information of an entry of the set of entries in a look-up table. The control circuitry 176 may selectively enable the supply of electrical power from power supply 172 to the vaporizer assembly 140 of the coupled cartridge 110 based on determining that the determined instance of information associated with cartridge 110 corresponds with a particular stored instance of information of a plurality of stored instances of information in a database.

In some example embodiments, in response to determining that the value of the determined instance of information (e.g., resistance value of resistor 216) does not correspond to any value of any instances of information (e.g., resistance values) of any entries of the set of entries, the control circuitry 176 may inhibit or maintain inhibition of the supply of electrical power from power supply 172 to contact 242-1, thereby inhibiting or maintaining the inhibition of vapor generation by e-vaping device 100 based on a determination that the cartridge 110 is a non-authenticated cartridge and/or is not included in a set of particular types of cartridges associated with the set of entries in the look-up table. The control circuitry 176 may further cause the one or more light-emitting devices 188-1, 188-2 to emit light 189-1, 189-2 having one or more particular properties (e.g., a particular set of properties) based on the determination that the cartridge 110 is a non-authenticated cartridge (e.g., the determined resistance value associated with the cartridge 110 does not correspond to stored resistance values of the plurality of stored resistance values in the database).

In some example embodiments, a look-up table may include entries identifying one or more values of one or more instances of information associated with non-authenticated types of cartridges 110 and associated cartridge properties. A control circuitry 176, having determined a value of a particular instance of information of a non-authenticated cartridge 110, may access the look-up table and identify that the determined value of the particular instance of information is within a range of values of instances of information stored in an entry associated with non-authenticated cartridges 110. The control circuitry 176 may then identify the one or more cartridge properties included in the same entry (e.g., associated with the identified range of values of instances of information in the entry) and may control one or more light-emitting devices 188-1, 188-2 to cause the one or more light-emitting devices 188-1, 188-2 to emit light 189-1, 189-2 having one or more particular properties (e.g., color, brightness, pattern, duration, etc.) to provide an indication that a non-authenticated cartridge 110 is coupled to the power supply assembly 170 and thus vapor generation by the e-vaping device 100 is selectively inhibited.

In some example embodiments, a look-up table may include entries identifying one or more values of one or more instances of information associated with authenticated types of cartridges 110 and associated cartridge properties. For example, a control circuitry 176, having determined a resistance value of a resistor 216 of a non-authenticated cartridge 110, may access the look-up table and identify that the determined resistance value is outside a range of resistance values stored in an entry associated with authenticated cartridges 110. The control circuitry 176 may then control one or more light-emitting devices 188-1, 188-2 to cause the one or more light-emitting devices 188-1, 188-2 to emit light 189-1, 189-2 having one or more particular properties (e.g., color, brightness, pattern, duration, etc.) to provide an indication that the power supply assembly 170 is not coupled to an authenticated cartridge 110 and thus vapor generation by the e-vaping device 100 is selectively inhibited.

In some example embodiments, the control circuitry 176 may further cause the one or more light-emitting devices 188-1, 188-2 to emit light 189-1, 189-2 having one or more particular properties (e.g., a particular set of properties) based on the determination that the determined value of the particular instance of information associated with the cartridge 110 is within the particular range of values associated with authenticated cartridges but does not correspond to any stored values of the plurality of stored values in the database).

In some example embodiments, the control circuitry 176 may be configured to selectively inhibit the one or more light-emitting devices 188-1, 188-2 from emitting light based on one or more particular determinations. For example, the control circuitry 176 may be configured to determine an amount of pre-vapor formulation held in the reservoir 120. In some example embodiments, the control circuitry 176 may be configured to determine an amount of pre-vapor formulation held in the reservoir 120 based on processing ("analyzing") the voltage difference between contact 242-1 and 242-2 when an electrical signal is applied to contact 242-1 and received from vaporizer assembly 140 via contact 242-2. The control circuitry 176 may selectively inhibit one or more light-emitting device 188-1, 188-2 from emitting light based on a determination that an amount of pre-vapor formulation held in the reservoir 120 is less than a threshold amount. The control circuitry 176 may also selectively inhibit light emission by the one or more light-emitting devices 188-1, 188-2 based on a determination that the determined value of the particular instance of information associated with the cartridge 110 is outside a particular range of values.

In some example embodiments, the control circuitry 176 may be configured to control the one or more light-emitting devices 188-1, 188-2 to adjust a brightness of light 189-1, 189-2 emitted by the one or more light-emitting devices 188-1, 188-2 based on a determined amount and/or proportion of pre-vapor formulation held in the reservoir 120. For example, the control circuitry 176 may be configured to cause the one or more light-emitting devices 188-1, 188-2 to emit light 189-1, 189-2 having a brightness that is proportional to an amount of pre-vapor formulation held in the reservoir 120 and/or a proportion of the reservoir 120 that is occupied by pre-vapor formulation.

In some example embodiments, the control circuitry 176 may be configured to control the one or more light-emitting devices 188-1, 188-2 to adjust a brightness of light 189-1, 189-2 emitted by the one or more light-emitting devices 188-1, 188-2 based on a determined amount of electrical power stored in the power supply 172. For example, the control circuitry 176 may be configured to cause the one or more light-emitting devices 188-1, 188-2 to emit light 189-1, 189-2 having a brightness that is proportional to an amount of electrical power stored in the power supply 172.

Figure 3:
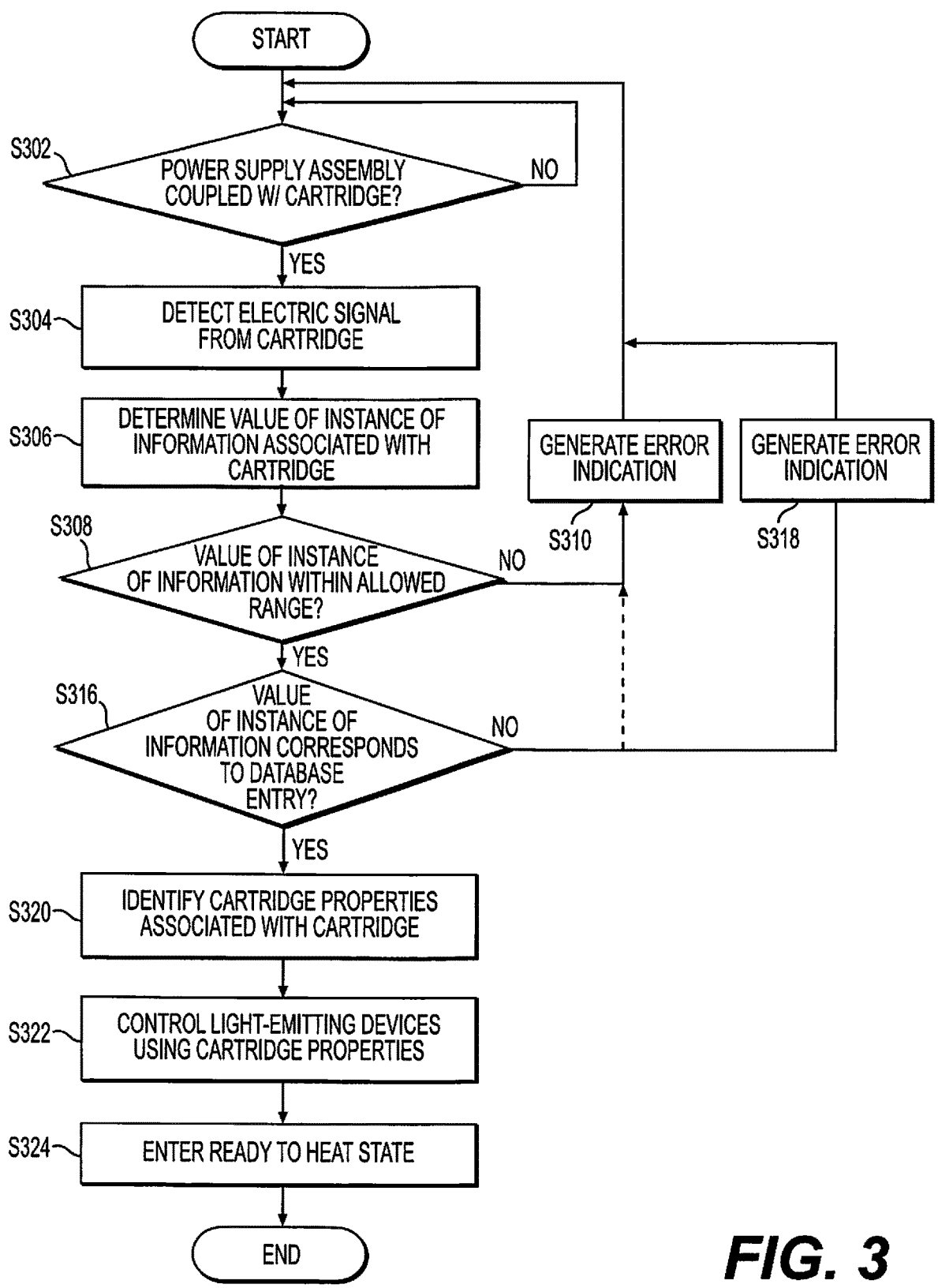
FIG. 3 is a flowchart illustrating operations that may be performed, according to some example embodiments.

FIG. 3 is a flowchart illustrating operations that may be performed, according to some example embodiments. The operations shown in FIG. 3 may be implemented at least partially by one or more of the example embodiments of the e-vaping device 100 included herein, including example embodiments of the control circuitry 176.

At S302, at least an instance of control circuitry 176 of a power supply assembly 170 may determine whether the power supply assembly 170 is coupled, at coupling interface 181, to a cartridge 110 to configure the cartridge 110 to generate a vapor based on electrical power supplied by the power supply assembly 170. Such a determination may include determining whether at least one electrical circuit through the control circuitry 176 and at least a portion of the cartridge 110 is established. Such a determination may include supplying electrical power (e.g., from power supply 172) to one or more electrical contacts of the control circuitry 176 (e.g., contact 244-1 in FIG. 2) and determining whether an electrical signal is received at one or more other electrical contacts of the control circuitry 176 (e.g., contact 244-3 in FIG. 2).

At S304, in response to a determination being made at S302 that the power supply assembly 170 is coupled with a cartridge 110, the control circuitry 176 may supply an electrical signal to one or more contacts of the control circuitry 176 (e.g., contact 244-1 in FIG. 2) and may detect a response electrical signal received at one or more contacts of the control circuitry 176 (e.g., contact 244-3 in FIG. 2). Such a received electrical signal may be assumed to have propagated through the identity circuit 210 of the cartridge 110, where the identity circuit 210 may have a particular associated resistance value (e.g., based on including one or more particular resistors 216 having one or more particular resistance values).

At S306, the control circuitry 176 may process the received electrical signal to determine a value of a particular instance of information (e.g., resistance value) associated with the cartridge 110. The determination may include comparing the received electrical signal with the initially supplied electrical signal as described above with reference to FIG. 2.

At S308, a determination is made regarding whether the value determined at S306 is within a particular range of values of instances of information associated with authenticated cartridges 110. The particular range (also referred to herein as an "allowable range" and/or "authenticated range") may be stored in a memory, e.g., in an accessible database. The accessible database may include a look-up table. The values of instances of information (e.g., resistance values) associated with the allowable range may be determined and added to the database via well-known empirical techniques to establish a database entry indicating values (e.g., resistance values) within an allowable range and/or values (e.g., resistance values) outside the allowable range.

In response to a determination that the value of the particular instance of information is outside the particular range, as shown at S310, the control circuitry 176 may cause the e-vaping device 100 to generate an error indication to indicate that the power supply assembly 170 is not coupled with an authenticated cartridge 110 and thus vapor generation by vaporizer assembly 140 remains inhibited. Such an error indication may be generated based on the control circuitry 176 controlling the one or more light-emitting devices 188-1, 188-2 and/or the light source 177 to emit light having one or more particular properties (e.g., color, brightness, duration, pattern, etc. and/or combinations thereof) to provide an "error" indication. The control circuitry 176 may determine the one or more particular properties of the emitted light associated with the "error" indication based on accessing a look-up table to determine one or more light properties associated with the determined value, identifying the one or more light properties based on said access (where the one or more light properties associated with the determined value in the look-up table are light properties associated with an error indication), and controlling the one or more light-emitting devices 188-1, 188-2 and/or the light source 177 to emit light having the one or more particular properties.

At S316, in response to a determination that the determined value of the particular instance of information associated with the coupled cartridge 110 is determined at S308 to be a value (e.g., resistance value) that is within the aforementioned particular range of values associated with authenticated cartridges 110, the control circuitry 176 may further process the determined value to determine whether the value matches or substantially matches a value of an instance of information stored in an accessible database accessible by the control circuitry 176.

In response to, as shown at S310 and S318, a determination being made that the determined value of the particular instance of information associated with the cartridge does not match or substantially match any stored values of instances of information, the control circuitry 176 may cause the e-vaping device 100 to generate an error indication. As shown in FIG. 3, the error indication may be the aforementioned error indication at S310, such that the error indication may be provided at S310 based on either the determined value being outside a particular range of values or being within the particular range but not matching or substantially matching any values of instances of information stored in an accessible database.

In some example embodiments, as shown in FIG. 3 at S318, the control circuitry 176 may respond to a determination that the determined value does not match or substantially match any values stored in an accessible database by causing the e-vaping device 100 to generate an error indication to indicate that the power supply assembly 170 is not coupled with an authenticated cartridge 110 and thus vapor generation remains inhibited, where the error indication provided at S318 is distinct from the error indication provided at S310. Such an error indication may be generated based on the control circuitry 176 controlling the one or more light-emitting devices 188-1, 188-2 and/or the light source 177 to emit light having one or more particular properties (e.g., color, brightness, duration, pattern, etc. and/or combinations thereof) that are at least partially different from the one or more particular properties that may be emitted by the one or more light-emitting devices at S310. Similarly to S310, the control circuitry 176 may determine the one or more particular properties of light associated with the "error" indication provided at S318 based on accessing a look-up table to determine one or more light properties associated with the determined value, identifying the one or more light properties based on said access (where the one or more light properties associated with the determined value in the look-up table are light properties associated with an error indication), and controlling the one or more light-emitting devices 188-1, 188-2 and/or the light source 177 to emit light having the one or more particular light properties.

At S320, in response to a determination that an entry in the accessible database includes a value of an instance of information that is matched or substantially matched by the determined value of the particular instance of information (e.g., resistance value) at S316, the control circuitry 176 processes the identified entry of the database to identify a set of cartridge properties (e.g., one or more properties of electrical power to be supplied to a light-emitting device and/or to a heating element 142 of the cartridge 110; one or more particular light properties (e.g., color, brightness, pattern, duration, etc. and/or combinations thereof) of light to be emitted by the light-emitting device; some combination thereof; or the like) that are associated with the entry (e.g., associated with the matching or substantially matching value of the instance of information stored in the database). Restated, at S320, a particular set of cartridge properties associated with a cartridge may be identified based on determining a value of a particular instance of information associated with the cartridge (S306), and the identifying may include determining that the value of the particular instance of information associated with the cartridge corresponds with a value of a particular stored instance of information of a plurality of values of stored instances of information in a database (S316=YES), where the particular stored instance of information is associated with a stored set of light properties.

At S322, the control circuitry 176 utilizes the identified one or more particular cartridge properties to control one or more light-emitting devices 188-1, 188-2 to emit light 189-1, 189-2 having one or more particular properties. Where the one or more particular cartridge properties include properties of electrical power to be supplied to a light-emitting device to cause the light-emitting device to emit light having particular properties, the operation at S322 may include the control circuitry 176 supplying electrical power to the light-emitting device in accordance with said properties. Where the one or more particular cartridge properties include properties of light to be emitted by the light-emitting device, the operation at S322 may include the control circuitry 176 determining one or more properties of electrical power to be supplied to cause the light-emitting device to emit light having the properties of light and further supplying said electrical power having the determined one or more properties.

In some example embodiments, the instance of information at S306 includes information indicating a particular set of electrical power properties of electrical power to be supplied to a light-emitting device to cause the light-emitting device to emit light having one or more particular properties, the value determined at S306 may be the values of the particular set of electrical power properties, operations S308, S316, and/or S320 may be omitted, and at S322 the control circuitry 176 may respond to the determination at S306 by supplying power having the particular set of electrical power properties to the one or more light-emitting devices 188-1, 188-2 to cause the one or more light-emitting devices 188-1, 188-2 to emit light 189-1, 189-2 having a particular set of light properties that is associated with the particular set of electrical power properties.

In some example embodiments, the instance of information at S306 includes information indicating a particular set of light properties, the value determined at S306 may be the values of the particular set of light properties, operations S308, S316, and/or S320 may be omitted, and at S322 the control circuitry 176 may respond to the determination at S306 by supplying power having a determined particular set of electrical power properties to the one or more light-emitting devices 188-1, 188-2 to cause the one or more light-emitting devices 188-1, 188-2 to emit light 189-1, 189-2 having the particular set of light properties. The control circuitry 176 may be configured to convert determined values of a particular set of light properties to values of a particular set of electrical power properties of electrical power to be supplied to the one or more light-emitting devices 188-1, 188-2 at S322 without accessing a database and/or look-up table.

At S324, the control circuitry 176 initiates a "ready to heat" state, wherein electrical power supply to the heating element 142 of the coupled cartridge 110 via a particular set of electrical contacts is selectively enabled by the control circuitry 176 based on the determination at S316. As a result, upon subsequent receipt of signals from sensor 174 indicating a draw of air through the e-vaping device 100, the control circuitry 176 may responsively supply electrical power to the heating element 142 based at least in part upon having selectively enabled the supply of electrical power and/or supply electrical power having one or more properties determined based on the identified set of cartridge properties to the heating element 142. In contrast, if operation S324 is not performed, for example in response to a determination that the determined value is outside the aforementioned particular range (S308=No) or does not match or substantially match any values stored in the accessible database (S316=No), the supply of electrical power from power supply 172 to the heating element 142 may be selectively inhibited, such that the control circuitry 176 may selectively refrain from supplying electrical power to the heating element even if signals indicating a draw on the e-vaping device 100 are received at the control circuitry 176 from sensor 174.

In some example embodiments, the instance of information at S306 and/or the cartridge properties identified at S320 includes information identifying electrical power properties of electrical power to be supplied to the heating element 142 of the cartridge 110, and, upon receipt of signals from sensor 174 indicating a draw of air through the e-vaping device 100, the control circuitry 176 may responsively supply electrical power having the electrical power properties to the heating element 142.

Example embodiments have been disclosed herein; it should be understood that other variations may be possible. Such variations are not to be regarded as a departure from the spirit and scope of the present disclosure, and all such modifications as would be obvious to one skilled in the art are intended to be included within the scope of the following claims.

We claim:
1. An e-vaping device, comprising:
a cartridge, the cartridge including,
a reservoir housing at least partially defining a reservoir, the reservoir configured to hold a pre-vapor formulation, and
a vaporizer assembly configured to draw the pre-vapor formulation from the reservoir and to heat the drawn pre-vapor formulation to form a vapor; and
a power supply assembly configured to supply electrical power, including to the cartridge to cause the vaporizer assembly to form the vapor, the power supply assembly including
a power supply configured to supply the electrical power;
a coupling interface configured to electrically couple the power supply to the vaporizer assembly;
a first light-emitting device configured to emit light, the first light-emitting device adjacent a first side of the coupling interface;
a second light-emitting device configured to emit light, the second light-emitting device adjacent a second side of the coupling interface opposite the first light-emitting device;
a first light tube structure having a proximate end and a distal end, the proximate end adjacent to the first light-emitting device, the distal end extending through the coupling interface; and
a second light tube structure having a proximate end and a distal end, the proximate end adjacent to the second light-emitting device, the distal end extending through the coupling interface, the first light tube structure and the second light tube structure configured to channel the emitted light from the proximate end of the first light tube structure and the second light tube structure to the distal end of the first light tube structure and the second light tube structure, such that the first light tube structure and the second light tube structure are configured to emit the channeled light into the reservoir housing of the cartridge to cause at least a portion of the cartridge to emit at least a portion of the channeled light to an external environment.

2. The e-vaping device of claim 1, wherein the first and second light tube structures are configured to emit the channeled light into the reservoir of the cartridge, via the reservoir housing, to illuminate pre-vapor formulation held in the reservoir to the external environment.

3. The e-vaping device of claim 1, wherein the reservoir housing is configured to channel the channeled light through an interior of the reservoir housing to be emitted to the external environment via at least a portion of the reservoir housing that is exposed by a housing of the power supply assembly.

4. The e-vaping device of claim 1, wherein at least a portion of the reservoir housing is transparent to visible light.

5. The e-vaping device of claim 4, wherein the portion of the reservoir housing is transparent to visible light in a direction that is substantially perpendicular to a longitudinal axis of the cartridge.

6. The e-vaping device of claim 1, wherein the first and second light-emitting devices are configured to emit light having a selected set of light properties of a plurality of sets of light properties.

7. The e-vaping device of claim 1, further comprising:
control circuitry configured to
identify a cartridge property associated with the cartridge, and
control the first and second light-emitting devices to emit light including a light property associated with the identified cartridge property.

8. The e-vaping device of claim 7, wherein the control circuitry is configured to identify the cartridge property based on determining a value of a particular instance of information associated with the cartridge.

9. The e-vaping device of claim 8, wherein the particular instance of information associated with the cartridge is a particular electrical resistance associated with the cartridge.

10. The e-vaping device of claim 1, wherein the power supply assembly and the cartridge are configured to be removably coupled together.

11. The e-vaping device of claim 10, further comprising:
one or more magnets configured to magnetically couple the power supply assembly and the cartridge together.

12. The e-vaping device of claim 11, wherein the one or more magnets are included in the power supply assembly.

13. The e-vaping device of claim 12, wherein the one or more magnets are included in the coupling interface of the power supply assembly.

14. The e-vaping device of claim 11, wherein the one or more magnets are included in the cartridge.

15. The e-vaping device of claim 1, wherein the power supply includes a rechargeable battery.

16. A power supply assembly for an e-vaping device, the power supply assembly comprising:
a power supply configured to supply electrical power;
a coupling interface configured to couple with a cartridge to configure the e-vaping device to generate a vapor, the cartridge including a reservoir housing at least partially defining a reservoir holding a pre-vapor formulation and a vaporizer assembly configured to heat pre-vapor formulation drawn from the reservoir to generate the vapor, the coupling interface configured to electrically couple the power supply to the vaporizer assembly;
a first light-emitting device configured to emit light, the first light-emitting device adjacent a first side of the coupling interface;
a second light-emitting device configured to emit light, the second light-emitting device adjacent a second side of the coupling interface opposite the first light-emitting device;
a first light tube structure having a proximate end and a distal end, the proximate end adjacent to the first light-emitting device, the distal end extending through the coupling interface; and
a second light tube structure having a proximate end and a distal end, the proximate end adjacent to the second light-emitting device, the distal end extending through the coupling interface, the first light tube structure and the second light tube structure configured to channel the emitted light from the proximate end of the first light tube structure and the second light tube structure to the distal end of the first light tube structure and the second light tube structure, such that the first light tube structure and the second light tube structure are configured to emit the channeled light into the reservoir housing of the cartridge to cause at least a portion of the cartridge to emit at least a portion of the channeled light to an external environment.

17. The power supply assembly of claim 16, wherein the first and second light tube structures are configured to emit the channeled light into the reservoir of the cartridge, via the reservoir housing, to illuminate pre-vapor formulation held in the reservoir to the external environment.

18. The power supply assembly of claim 16, wherein the reservoir housing is configured to channel the channeled light through an interior of the reservoir housing to be emitted to the external environment via at least a portion of the reservoir housing that is transparent, exposed by a housing of the power supply assembly, or both transparent and exposed by the housing.

19. The power supply assembly of claim 16, wherein the first and second light-emitting devices are configured to emit light having a selected set of light properties of a plurality of sets of light properties.

20. The power supply assembly of claim 16, further comprising:
control circuitry configured to
identify a cartridge property associated with the cartridge, and
control the first and second light-emitting devices to emit light including a light property associated with the identified cartridge property.

21. The power supply assembly of claim 20, wherein the control circuitry is configured to identify the cartridge property based on determining a value of a particular instance of information associated with the cartridge.

22. The power supply assembly of claim 21, wherein the particular instance of information associated with the cartridge is a particular electrical resistance associated with the cartridge.

23. The power supply assembly of claim 16, further comprising:
one or more magnets configured to magnetically couple the power supply assembly to the cartridge.

24. The power supply assembly of claim 23, wherein the one or more magnets are included in the power supply assembly.

25. The power supply assembly of claim 24, wherein the one or more magnets are included in the coupling interface of the power supply assembly.

26. The power supply assembly of claim 23, wherein the one or more magnets are included in the cartridge.

27. An e-vaping device, comprising:
a cartridge, the cartridge including,
a reservoir housing at least partially defining a reservoir, the reservoir configured to hold a pre-vapor formulation, and
a vaporizer assembly configured to draw the pre-vapor formulation from the reservoir and to heat the drawn pre-vapor formulation to form a vapor; and
a power supply assembly configured to supply electrical power, including to the cartridge to cause the vaporizer assembly to form the vapor, the power supply assembly including
a power supply configured to supply the electrical power;
a coupling interface configured to electrically couple the power supply to the vaporizer assembly;

a first light-emitting device configured to emit light, the first light-emitting device adjacent a first side of the coupling interface;

a second light-emitting device configured to emit light, the second light-emitting device adjacent a second side of the cooling interface opposite the first light-emitting device;

a first light tube structure having a proximate end and a distal end, the proximate end adjacent to the first light-emitting device, the distal end extending through the coupling interface; and a second light tube structure having a proximate end and a distal end, the proximate end adjacent to the second light-emitting device, the distal end extending through the coupling interface, the first light tube structure and the second light tube structure configured to channel the emitted light from the proximate end of the first light tube structure and the second light tube structure to the distal end of the first light tube structure and the second light tube structure, such that the first light tube structure and the second light tube structure are configured to emit the channeled light into the cartridge to cause at least a portion of the cartridge to emit at least a portion of the channeled light to an external environment.

28. The e-vaping device of claim 27, wherein the first and second light-emitting devices are configured to emit light having a selected set of light properties of a plurality of sets of light properties.

29. The e-vaping device of claim 27, further comprising:
control circuitry configured to
identify a cartridge property associated with the cartridge, and
control the first and second light-emitting devices to emit light including a light property associated with the identified cartridge property.

30. The e-vaping device of claim 29, wherein the control circuitry is configured to identify the cartridge property based on determining a value of a particular instance of information associated with the cartridge.

31. The e-vaping device of claim 30, wherein the particular instance of information associated with the cartridge is a particular electrical resistance associated with the cartridge.

32. The e-vaping device of claim 27, wherein the power supply assembly and the cartridge are configured to be removably coupled together.

33. The e-vaping device of claim 32, further comprising:
one or more magnets configured to magnetically couple the power supply assembly and the cartridge together.

34. The e-vaping device of claim 33, wherein the one or more magnets are included in the power supply assembly.

35. The e-vaping device of claim 34, wherein the one or more magnets are included in the coupling interface of the power supply assembly.

36. The e-vaping device of claim 33, wherein the one or more magnets are included in the cartridge.

37. A power supply assembly for an e-vaping device, the power supply assembly comprising:
a power supply configured to supply electrical power;
a coupling interface configured to couple with a cartridge to configure the e-vaping device to generate a vapor, the cartridge including a reservoir housing at least partially defining a reservoir holding a pre-vapor formulation and a vaporizer assembly configured to heat pre-vapor formulation drawn from the reservoir to generate the vapor, the coupling interface configured to electrically couple the power supply to the vaporizer assembly;

a first light-emitting device configured to emit light, the first light-emitting device adjacent a first side of the coupling interface;

a second light-emitting device configured to emit light, the second light-emitting device adjacent a second side of the coupling interface opposite the first light-emitting device;

a first light tube structure having a proximate end and a distal end, the proximate end adjacent to the first light-emitting device, the distal end extending through the coupling interface, a second light tube structure having a proximate end and a distal end, the proximate end adjacent to the second light-emitting device, the distal end extending through the coupling interface, the first light tube structure and the second light tube structure configured to channel the emitted light from the proximate end of the first light tube structure and the second light tube structure to the distal end of the light tube structure and the second light tube structure, such that the first light tube structure and the second light tube structure are configured to emit the channeled light into the cartridge to cause at least a portion of the cartridge to emit at least a portion of the channeled light to an external environment.

38. The power supply assembly of claim 37, wherein the first and second light-emitting devices are configured to emit light having a selected set of light properties of a plurality of sets of light properties.

39. The power supply assembly of claim 37, further comprising:
control circuitry configured to
identify a cartridge property associated with the cartridge, and
control the first and second light-emitting devices to emit light including a light property associated with the identified cartridge property.

40. The power supply assembly of claim 39, wherein the control circuitry is configured to identify the cartridge property based on determining a value of a particular instance of information associated with the cartridge.

41. The power supply assembly of claim 40, wherein the particular instance of information associated with the cartridge is a particular electrical resistance associated with the cartridge.

42. The power supply assembly of claim 37, further comprising:
one or more magnets configured to magnetically couple the power supply assembly to the cartridge.

43. The power supply assembly of claim 42, wherein the one or more magnets are included in the power supply assembly.

44. The power supply assembly of claim 43, wherein the one or more magnets are included in the coupling interface of the power supply assembly.

45. The power supply assembly of claim 42, wherein the one or more magnets are included in the cartridge.

46. The e-vaping device of claim 1, wherein the first light tube structure and the second light tube structure are configured to emit the channeled light into one or more end portions of the reservoir housing of the cartridge.

* * * * *